US010730120B2

(12) United States Patent
Pierce et al.

(10) Patent No.: US 10,730,120 B2
(45) Date of Patent: Aug. 4, 2020

(54) PIPE MACHINING APPARATUSES AND METHODS OF OPERATING THE SAME

(71) Applicant: ILLINOIS TOOL WORKS INC., Glenview, IL (US)

(72) Inventors: Kenneth R. Pierce, Arlington Heights, IL (US); Michael W. Gearhart, Prospect Heights, IL (US)

(73) Assignee: ILLINOIS TOOL WORKS, Glenview, IL (US)

( * ) Notice: Subject to any disclaimer, the term of this patent is extended or adjusted under 35 U.S.C. 154(b) by 0 days.

(21) Appl. No.: 15/976,294

(22) Filed: May 10, 2018

(65) Prior Publication Data

US 2018/0257156 A1 Sep. 13, 2018

Related U.S. Application Data

(62) Division of application No. 15/007,928, filed on Jan. 27, 2016, now Pat. No. 10,029,320, which is a
(Continued)

(51) Int. Cl.
*B23B 5/14* (2006.01)
*B23D 21/04* (2006.01)
(Continued)

(52) U.S. Cl.
CPC ............... *B23D 21/04* (2013.01); *B23B 3/26* (2013.01); *B23B 5/08* (2013.01); *B23B 5/14* (2013.01);
(Continued)

(58) Field of Classification Search
CPC ............... Y10T 82/22; Y10T 82/16967; Y10T 82/2522; B23B 5/08; B23B 5/14;
(Continued)

(56) References Cited

U.S. PATENT DOCUMENTS 257,833 A 5/1882 Warren et al.
760,128 A 5/1904 Jackson
(Continued)

FOREIGN PATENT DOCUMENTS

AU 2006282045 A1 6/2006
CA 2673724 A1 7/2008
(Continued)

OTHER PUBLICATIONS

International Search Report and Written Opinion for PCT/US2013/077718 dated Sep. 5, 2014, 14 pages.
(Continued)

*Primary Examiner* — Nicole N Ramos
(74) *Attorney, Agent, or Firm* — Klintworth & Rozenblat IP LLP

(57) ABSTRACT

Pipe machining apparatuses are provided. In some aspects, a pipe machining apparatus may include a hinge to allow two sections of the pipe machining apparatus to move relative to one another. In another aspect, a support member may be provided to support a pipe machining apparatus on a surface. In a further aspect, a support member may be provided that allows lifting of a pipe machining apparatus in either a horizontal position or a vertical position.

12 Claims, 31 Drawing Sheets

Related U.S. Application Data division of application No. 13/798,782, filed on Mar. 13, 2013, now Pat. No. 9,278,417.

(60) Provisional application No. 61/750,445, filed on Jan. 9, 2013.

(51) Int. Cl.
| | | |
|---|---|---|
| *B23B 5/08* | (2006.01) | |
| *B23Q 9/00* | (2006.01) | |
| *B23B 3/26* | (2006.01) | |
| *B26D 3/16* | (2006.01) | |
| *B23Q 9/02* | (2006.01) | |
| *B26D 7/00* | (2006.01) | |

(52) U.S. Cl.
CPC ......... *B23Q 9/0021* (2013.01); *B23Q 9/0057* (2013.01); *B23Q 9/02* (2013.01); *B26D 3/16* (2013.01); *B23B 2215/72* (2013.01); *B26D 7/00* (2013.01); *Y10T 82/16442* (2015.01); *Y10T 82/22* (2015.01); *Y10T 82/2522* (2015.01); *Y10T 82/30* (2015.01)

(58) Field of Classification Search
CPC ......... B23B 3/26; B23B 225/72; B23D 21/04; B23Q 9/0021; B23Q 9/0057; B23Q 9/02; B26D 3/16; B26D 7/00
See application file for complete search history.

(56) References Cited

U.S. PATENT DOCUMENTS

| | | | |
|---|---|---|---|
| 768,128 A | 5/1904 | Jackson | |
| 1,074,334 A | 9/1913 | Vosper | |
| 1,097,152 A | 5/1914 | Wagner | |
| 1,279,022 A | 9/1918 | Scott | |
| 1,979,966 A | 11/1934 | Farr et al. | |
| RE20,974 E | 1/1939 | Guirl et al. | |
| 2,364,963 A | 12/1944 | Elliott | |
| 2,493,512 A | 1/1950 | Vickers | |
| 2,537,916 A | 1/1951 | Rosenboom | |
| 2,567,833 A | 9/1951 | Warren et al. | |
| 2,635,270 A | 4/1953 | Dawson | |
| 2,902,875 A | 9/1959 | Finally | |
| 3,617,142 A | 11/1971 | Wane et al. | |
| 3,650,514 A | 3/1972 | Stunkard | |
| 3,665,482 A | 5/1972 | Cresswell | |
| 3,732,618 A | 5/1973 | Lorenz | |
| 3,733,939 A * | 5/1973 | Paysinger | B23B 5/162 144/205 |
| 3,807,034 A | 4/1974 | Pevzner | |
| 3,819,163 A | 6/1974 | Stunkard | |
| 3,848,489 A | 11/1974 | Santana | |
| 3,992,123 A | 11/1976 | Uyetake | |
| 4,050,335 A | 9/1977 | Gilmore | |
| 4,063,355 A | 12/1977 | Netzel | |
| 4,185,525 A | 1/1980 | Sherer | |
| 4,211,510 A | 7/1980 | Hopkins | |
| 4,217,061 A | 8/1980 | Spanel | |
| 4,318,391 A | 3/1982 | Wachs et al. | |
| 4,402,136 A | 9/1983 | Rast | |
| 4,482,136 A | 11/1984 | Wolf et al. | |
| 4,483,223 A | 11/1984 | Nall | |
| 4,490,909 A | 1/1985 | Wachs et al. | |
| 4,543,861 A | 10/1985 | Kwech et al. | |
| 4,596,090 A * | 6/1986 | Gundy | B24B 19/02 451/51 |
| 4,614,136 A | 9/1986 | Pertle | |
| 4,625,464 A | 12/1986 | Kubo | |
| 4,655,108 A | 4/1987 | Galos | |
| 4,677,884 A | 7/1987 | Kwech et al. | |
| 4,682,919 A | 7/1987 | Mitchell | |
| 4,706,939 A * | 11/1987 | Gagne | E03B 9/00 254/332 |
| 4,709,604 A * | 12/1987 | Rogers | B23C 1/20 29/27 A |
| 4,739,685 A | 4/1988 | Ricci | |
| 4,762,038 A | 8/1988 | Olson | |
| 4,770,074 A | 9/1988 | Kwech | |
| 4,791,842 A | 12/1988 | Olson | |
| 4,813,314 A | 3/1989 | Kwech | |
| 4,880,340 A | 11/1989 | Taki | |
| 4,939,964 A | 7/1990 | Ricci | |
| 5,054,342 A | 10/1991 | Swiatowy et al. | |
| 5,085,619 A | 2/1992 | Torii | |
| 5,097,583 A | 3/1992 | Kramer | |
| 5,159,868 A | 11/1992 | Thomas et al. | |
| 5,243,901 A * | 9/1993 | Green | B65B 13/06 100/25 |
| 5,368,399 A | 11/1994 | Tremblay | |
| 5,429,021 A | 7/1995 | Astle et al. | |
| 5,467,627 A | 11/1995 | Smith et al. | |
| 5,549,024 A | 8/1996 | Ricci | |
| 5,881,618 A | 3/1999 | Ricci et al. | |
| 6,065,378 A | 5/2000 | Ricci | |
| 6,257,110 B1 | 7/2001 | Ricci | |
| 6,293,174 B1 | 9/2001 | Rulseh | |
| 6,401,864 B1 | 6/2002 | Stringer | |
| 6,604,896 B2 | 8/2003 | Feldman | |
| 6,619,164 B1 | 9/2003 | Ricci et al. | |
| 6,634,838 B2 | 10/2003 | Kitamura | |
| 6,810,587 B1 | 11/2004 | Robertson | |
| 6,966,731 B2 | 11/2005 | VanderPol et al. | |
| 7,270,505 B2 | 9/2007 | VanderPol et al. | |
| 7,510,452 B2 * | 3/2009 | Van Tol | B63B 22/026 441/5 |
| 7,891,718 B2 * | 2/2011 | Heinaman | B66C 1/105 294/67.5 |
| 8,250,953 B2 | 8/2012 | Hall et al. | |
| 8,584,558 B2 | 11/2013 | Phillips et al. | |
| 8,997,611 B1 | 4/2015 | Walton | |
| 9,021,927 B2 | 5/2015 | Phillips, II | |
| 9,050,669 B2 | 6/2015 | Coakley | |
| 9,278,417 B2 | 3/2016 | Pierce | |
| 2001/0001935 A1 | 5/2001 | Wilk, Jr. | |
| 2004/0234352 A1 | 11/2004 | Vanderpol et al. | |
| 2007/0023590 A1 | 2/2007 | Lotz | |
| 2007/0241250 A1 | 10/2007 | Wong | |
| 2009/0229919 A1 | 9/2009 | McDonald | |
| 2010/0162860 A1 | 7/2010 | Hall et al. | |
| 2010/0162862 A1 | 7/2010 | Hall et al. | |
| 2010/0237205 A1 | 9/2010 | Hirsh | |
| 2012/0054998 A1 | 3/2012 | Tschida | |
| 2013/0152748 A1 | 6/2013 | Wokan et al. | |
| 2014/0096662 A1* | 4/2014 | Coakley | B23Q 1/25 83/745 |
| 2014/0096663 A1* | 4/2014 | Coakley | B23Q 9/02 83/745 |
| 2014/0190322 A1 | 7/2014 | Pierce et al. | |
| 2015/0054998 A1 | 2/2015 | Kanou | |
| 2016/0136741 A1 | 5/2016 | Pierce | |

FOREIGN PATENT DOCUMENTS

| | | |
|---|---|---|
| CN | 2133745 Y | 5/1993 |
| CN | 1093959 A | 10/1994 |
| CN | 2254385 Y | 5/1997 |
| CN | 2761329 Y | 3/2006 |
| CN | 2863747 Y | 1/2007 |
| CN | 2934709 Y | 8/2007 |
| CN | 201195661 Y | 2/2009 |
| CN | 101384393 A | 3/2009 |
| CN | 101573198 A | 11/2009 |
| CN | 101932400 A | 12/2010 |
| CN | 202829285 U | 3/2013 |
| CN | 103089969 A | 5/2013 |
| DE | 2705628 A1 | 8/1978 |
| DE | 3521697 A1 | 2/1986 |
| FR | 2911805 A | 8/2008 |
| GB | 818753 A | 8/1959 |
| GB | 828940 A | 2/1960 |
| GB | 1450774 A | 9/1976 |

(56) References Cited

FOREIGN PATENT DOCUMENTS

| | | | |
|---|---|---|---|
| NL | 7907801 | A | 4/1981 |
| TW | 201129436 | A | 9/2011 |
| WO | 2007024326 | A1 | 3/2007 |
| WO | 2007/052035 | A1 | 5/2007 |
| WO | 2010/077346 | A1 | 7/2010 |

OTHER PUBLICATIONS

International Search Report and Written Opinion for PCT/US2013/077721 dated Aug. 22, 2014, 19 pages.
International Search Report and Written Opinion for PCT/US2013/077719 dated Jul. 4, 2014, 18 pages.
English Machine Translation of CN 2133745.
English Machine Translation of CN 2863747.
English Machine Translation of CN 201195661.
English Machine Translation of CN 202829285.

* cited by examiner

PIPE MACHINING APPARATUSES AND METHODS OF OPERATING THE SAME

RELATED APPLICATIONS

The present application is a divisional of U.S. Non-Provisional patent application Ser. No. 15/007,928, filed Jan. 27, 2016, which is a divisional of U.S. Non-Provisional patent application Ser. No. 13/798,782, filed Mar. 13, 2013, now U.S. Pat. No. 9,278,417, issued Mar. 8, 2016, which claims the priority benefit of U.S. Provisional Patent Application No. 61/750,445, filed Jan. 9, 2013, all of which are incorporated by reference herein in their entirety.

FIELD OF THE INVENTION

The present disclosure generally relates to pipe machining apparatuses and, more particularly, to split frame pipe machining apparatuses for machining large diameter pipes.

BACKGROUND

A variety of different types of pipe machining apparatuses exist to perform various machining processes on pipes. One such process includes cutting pipes. Large diameter pipes may be cut with a split frame pipe machining apparatus, which includes two frame halves that surround the pipe from respective sides and are coupled together around the pipe. Such a pipe cutter includes a tool or cutting device that encircles the pipe and moves toward the pipe in small increments during the cutting process in order to slowly cut into the pipe. Eventually, after many small increments of adjustment toward the pipe, the pipe will be completely cut.

Existing pipe cutting apparatuses may be large in size, heavy, and contain multiple components, thereby making it difficult to assemble and manipulate the pipe cutting apparatus. Moreover, such pipe cutting apparatuses may be difficult to position around a pipe.

Furthermore, due to the roller bearings between the tool carrier and the frame of pipe machining apparatuses, the tool carrier may move relative to the frame during assembly and set up of pipe machining apparatuses. Prior to assembly of the sections or halves of the pipe machining apparatus, the sections of pipe machining apparatus have open ends and the sections of the tool carrier may undesirably slide off of the frame sections.

Additionally, split frame pipe machining apparatuses are limited in the manners that they can couple to pipes. The components utilized to couple the pipe machining apparatuses to pipes have limitations that do not provide a wide variety of functionality.

Pipe machining apparatuses include a plurality of bearings between the tool carrier and the frame to facilitate movement of the tool carrier relative to the frame and the pipe. Such bearings undergo significant stresses and oftentimes prematurely wear due to improper lubrication.

SUMMARY

The present disclosure is defined by the following claims, and nothing in this section should be taken as a limitation on those claims.

In one aspect, a pipe machining apparatus is provided and includes a first section including a first portion of a frame and a first portion of a tool carrier and a second section including a second portion of the frame and a second portion of the tool carrier. The first section and the second section are adapted to be coupled together around at least a portion of a pipe. The frame is adapted to be fixed relative to the pipe and the tool carrier is adapted to move relative to the frame and the pipe. The pipe machining apparatus also including a hinge coupled to the first section and the second section. The hinge is adapted to allow movement of the first section and the second section relative to each other about the hinge.

In another aspect, a support member for a pipe machining apparatus is provided. The support member includes a coupling member adapted to engage and couple the support member to the pipe machining apparatus, a body coupled to and extending from the coupling member, and a pad coupled to the body and adapted to engage a surface upon which to support the pipe machining apparatus.

In a further aspect, a pipe machining apparatus is provided and includes a frame adapted to be coupled to and fixed relative to a pipe, a tool carrier coupled to and movable relative to the frame and the pipe, and a support member coupled to the frame. The support member includes a first flange defining a first aperture therein and a second flange defining a second aperture therein. The support member is adapted to be coupled to a lifting mechanism to lift the pipe machining apparatus.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
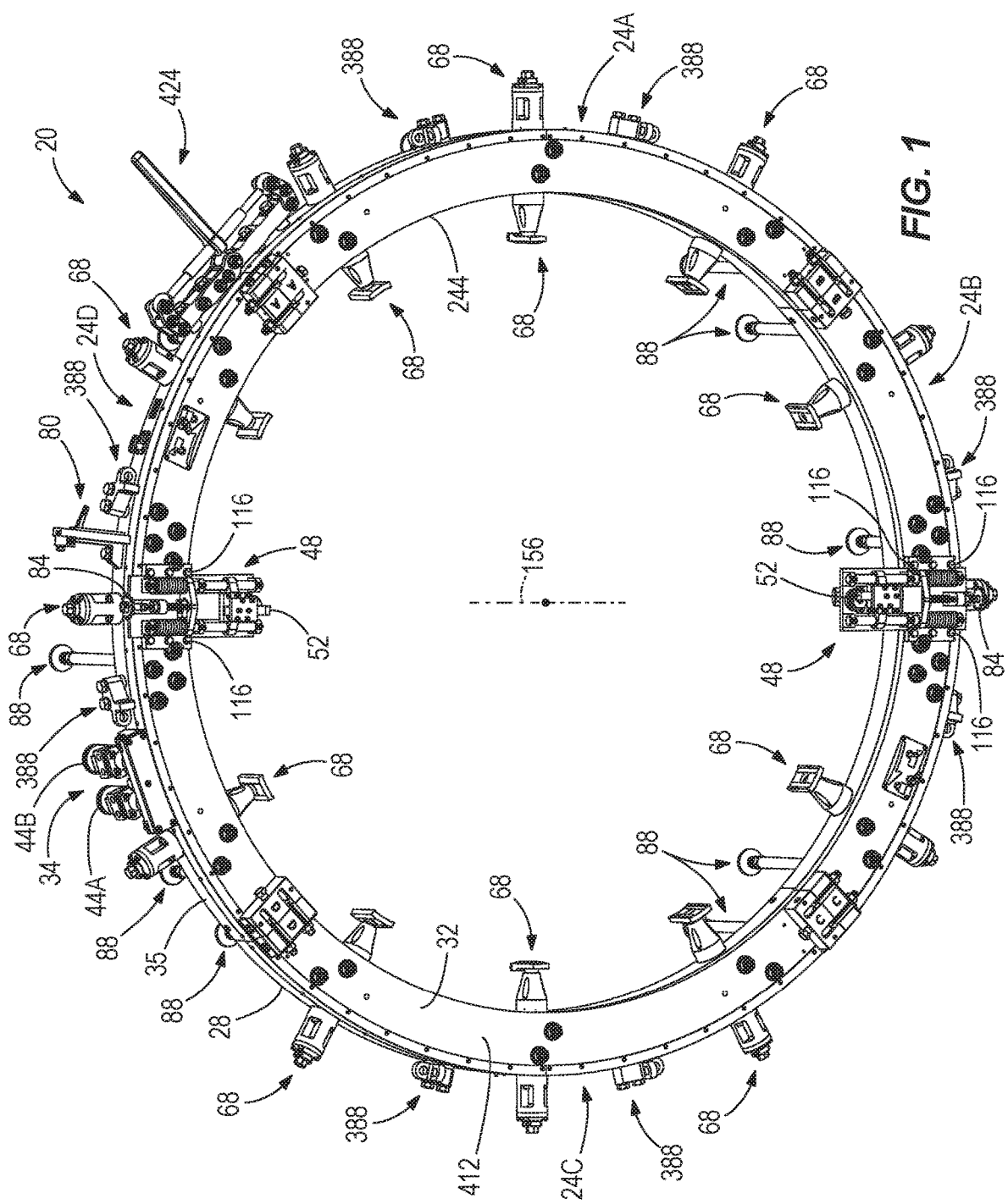
FIG. 1 is a top front perspective view of an exemplary pipe machining apparatus, in accordance with one embodiment.
Figure 2:
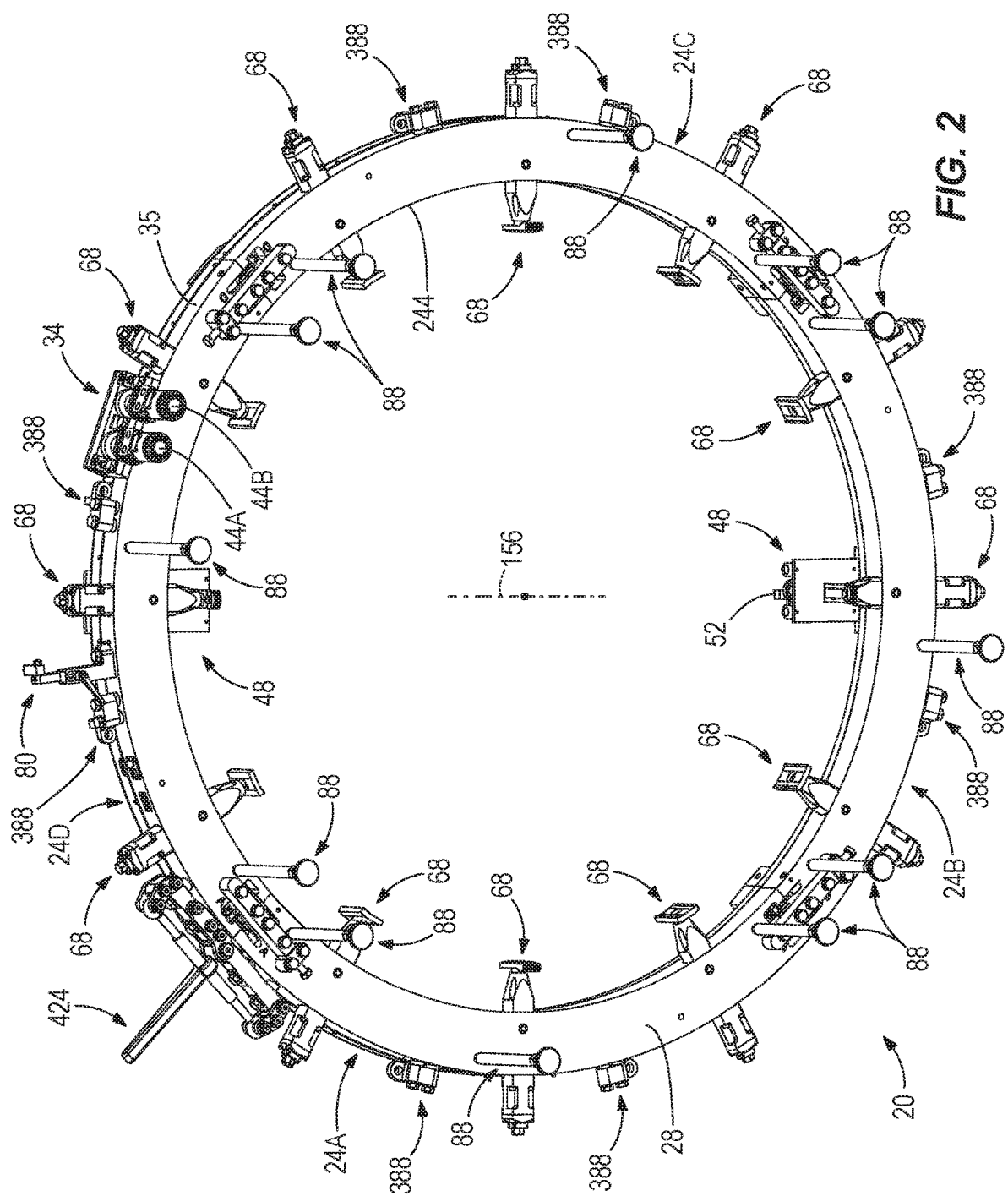
FIG. 2 is a top rear perspective view of the pipe machining apparatus illustrated in FIG. 1, in accordance with one embodiment.
Figure 3:
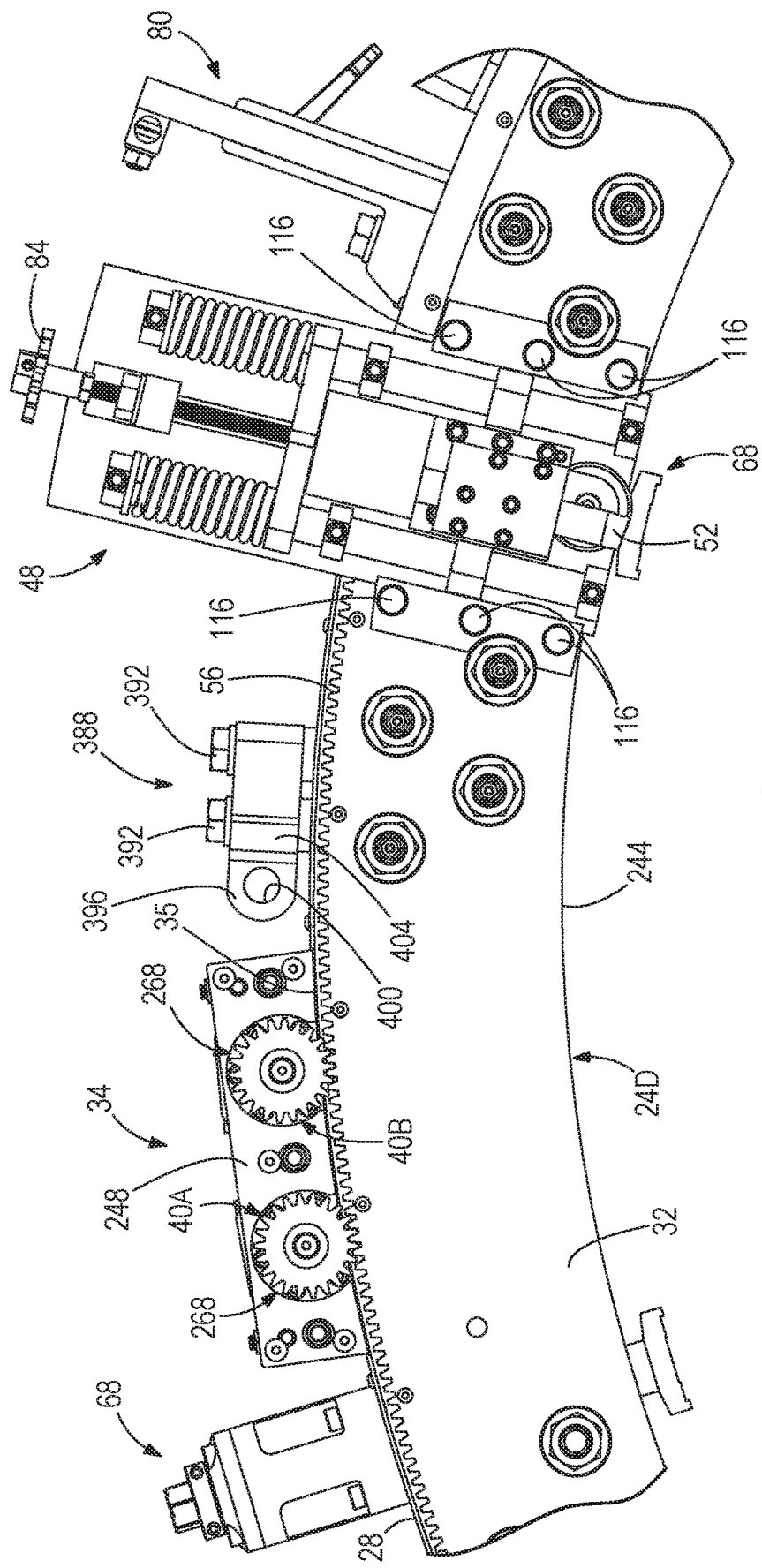
FIG. 3 is a front view of a portion of the pipe machining apparatus illustrated in FIG. 1 with a portion thereof broken away to show meshing of pinion gears and a gear rack of the pipe machining apparatus, in accordance with one embodiment.
Figure 4:
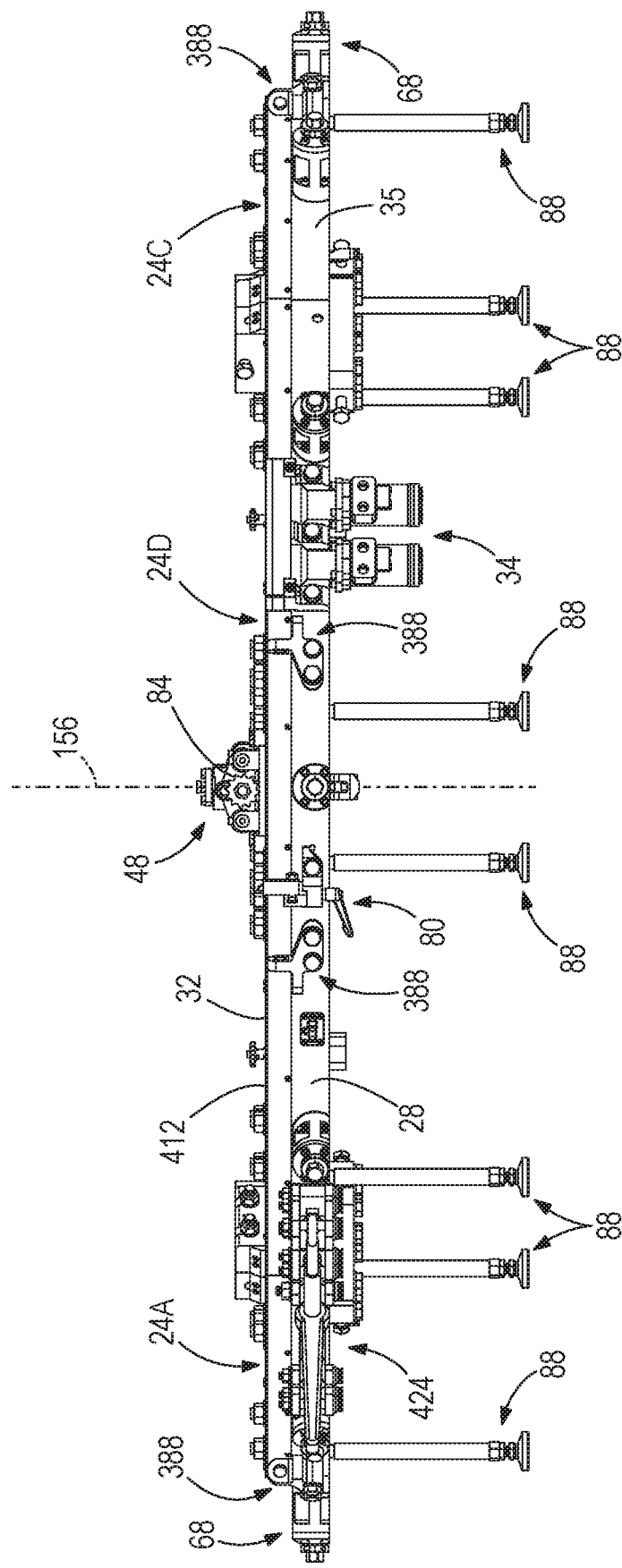
FIG. 4 is an elevational view of the pipe machining apparatus illustrated in FIG. 1, in accordance with one embodiment.
Figure 5:
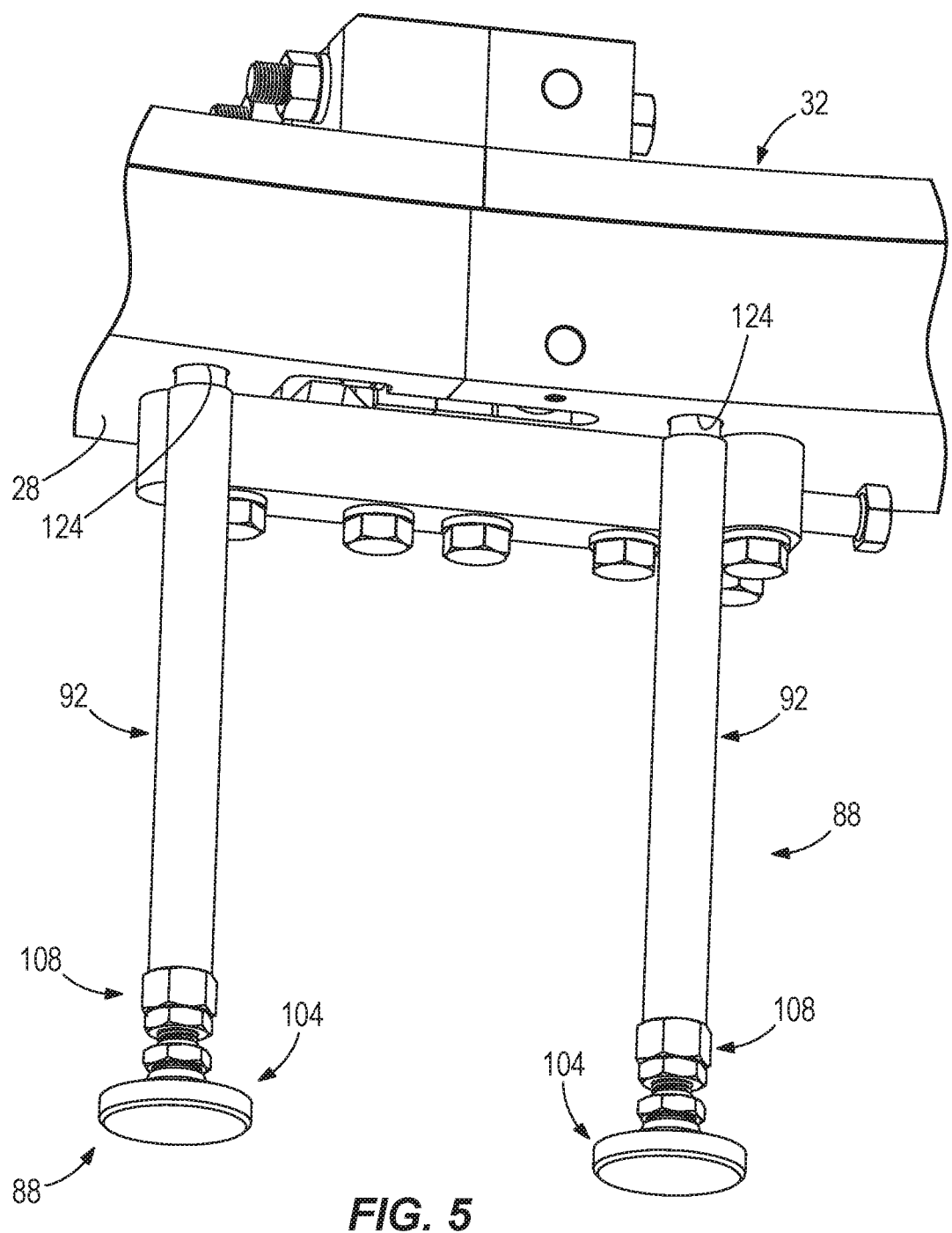
FIG. 5 is a bottom perspective view of a plurality of support members of the pipe machining apparatus illustrated in FIG. 1, in accordance with one embodiment.
Figure 6:
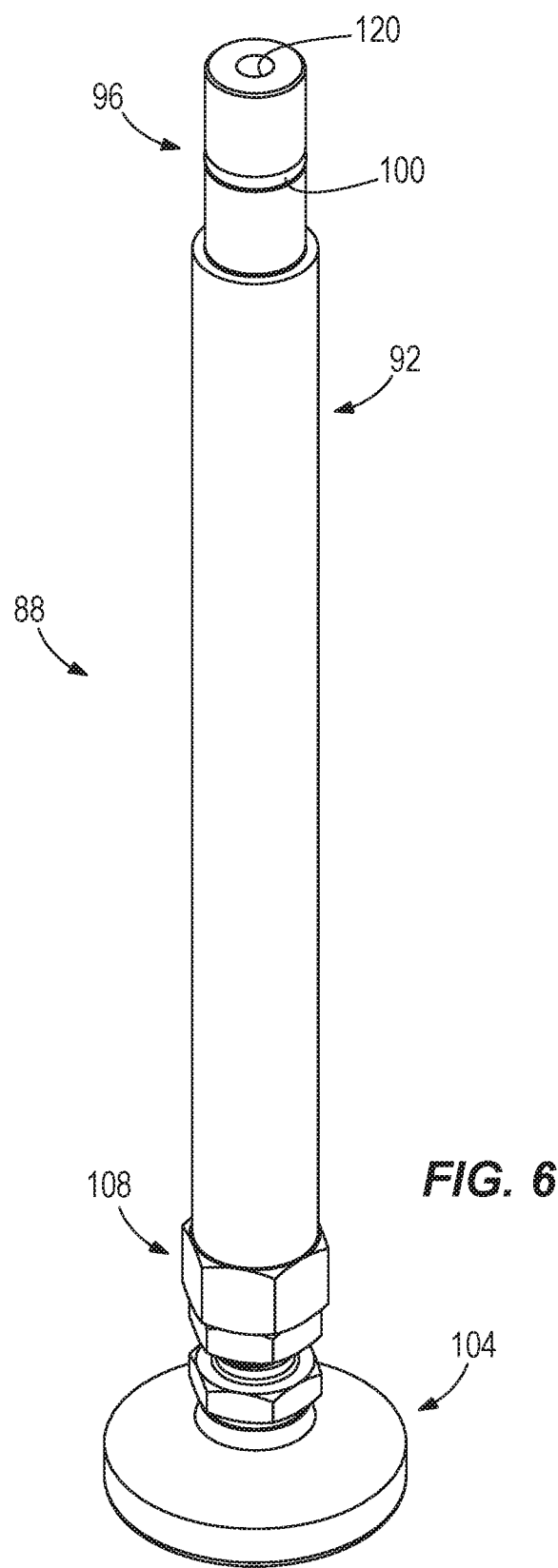
FIG. 6 is a top perspective view of one of the support members illustrated in FIG. 5, in accordance with one embodiment.
Figure 7:
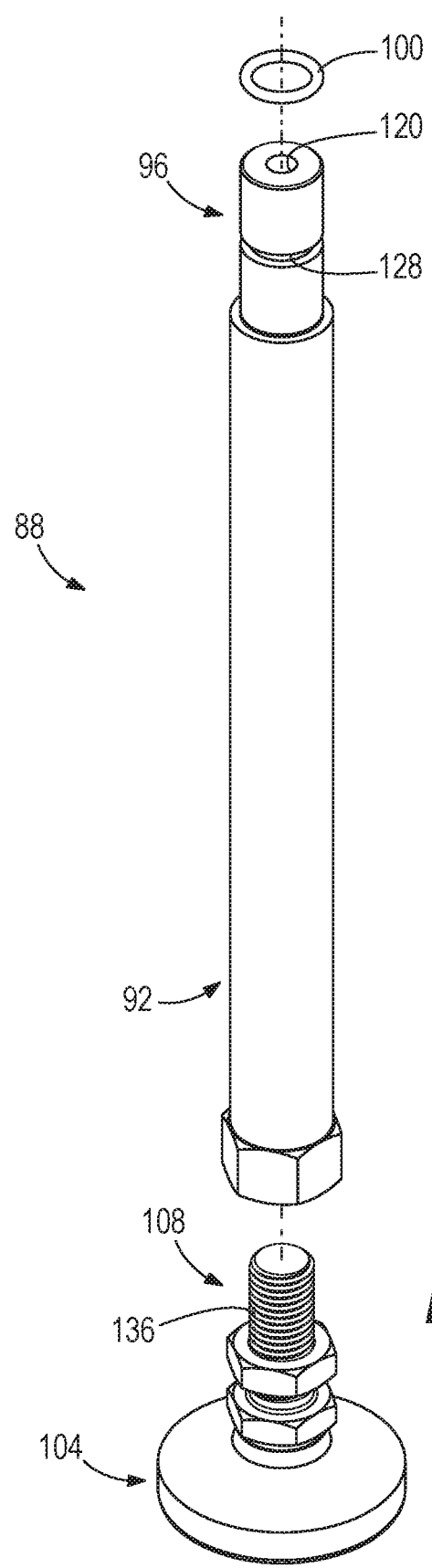
FIG. 7 is an exploded view of the support member illustrated in FIG. 6, in accordance with one embodiment.
Figure 8:
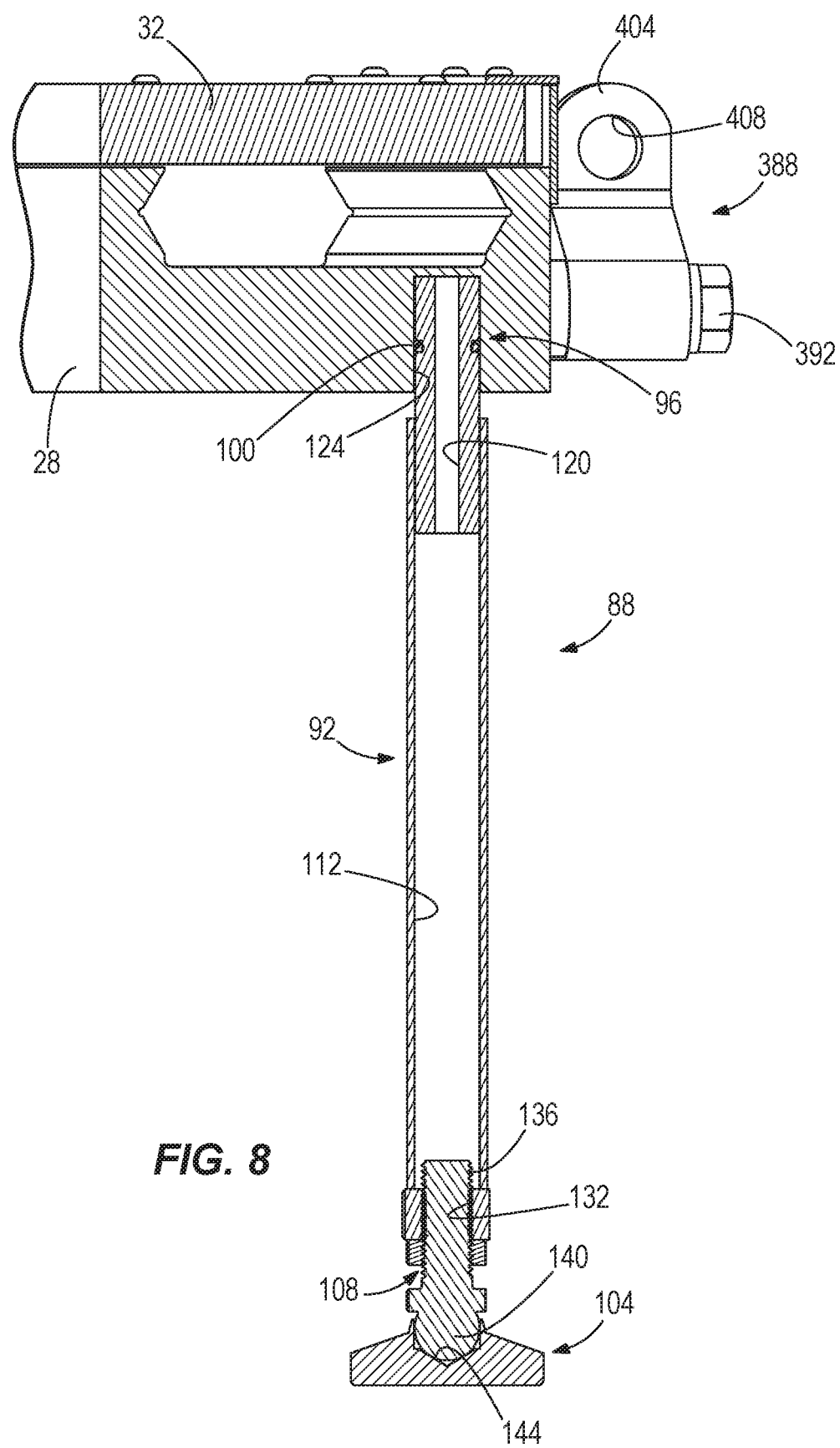
FIG. 8 is a cross-sectional view of the support member and a portion of the pipe machining apparatus illustrated in FIG. 1, the cross-section is taken along a plane parallel to a longitudinal extent of the support member and through a center of the support member, in accordance with one embodiment.

With reference to FIGS. 1-3, an exemplary embodiment of a pipe machining apparatus 20 adapted to machine pipes of varying diameters is illustrated. In some exemplary embodiments, the apparatus 20 completely cuts through pipes. In other exemplary embodiments, the apparatus 20 prepares an end of a pipe for coupling to another pipe. In still other exemplary embodiments, the apparatus 20 both completely cuts and prepares a pipe for coupling to another pipe. The apparatus 20 is adapted to cut pipes of a variety of different diameters such as, for example, about 60 inches, about 75 inches, about 90 inches, about 105 inches, about 120 inches, less than 60 inches, greater than 120 inches, or any other pipe diameter.

In the illustrated exemplary embodiment, pipe machining apparatus 20 is formed of four joined-together sections 24A, 24B, 24C, 24D and includes a frame 28 and a tool carrier 32. A portion of the frame 28 and the tool carrier 32 are included in each section 24A, 24B, 24C, 24D and the four sections 24A, 24B, 24C, 24D together comprise the frame 28 and the tool carrier 32. A drive mechanism 34 is coupled to a periphery or circumference 35 of the frame 28 and includes a pair of pinion gears 40A, 40B respectively coupled with a pair of suitable drive motors 44A, 44B, such as an air motor with suitable gear reduction means. The frame 28 is adapted to couple and be fixed relative to a pipe, and the tool carrier 32 is rotatable relative to the fixed frame 28 and the pipe. The motors 44A, 44B are adapted to rotate the tool carrier 32 relative to the frame 28 through a gear train. The tool carrier 32 has a circular gear rack 56 for meshing with the pinion gears 40A, 40B coupled to the motors 44A, 44B. Therefore, it can be seen that drive motors 44A, 44B are adapted to rotate tool carrier 32 relative to the frame 28 through a gear train provided by pinion gears 40A, 40B and circular gear rack 56 on the tool carrier 32.

The rotatable tool carrier 32 includes one or more tool supports 48 (two tool supports 48 shown in the illustrated exemplary embodiment), which support tools 52 for performing a cutting or machining operation on the pipe as the tools 52 rotate circumferentially about the pipe. The tool supports 48 are coupled to the tool carrier 32 by a plurality of fasteners 116. The machining operation performed by the tool(s) 52 may form a straight edge perpendicular to a longitudinal extent of the pipe, a bevel on an end of the pipe that is transverse to the longitudinal extent and at an angle other than ninety degrees to the longitudinal extent of the pipe, or an edge of a pipe having any angle.

The apparatus 20 further includes a plurality of coupling members 68 engageable with an exterior of the pipe and having suitable adjustability to couple and concentrically or axially locate the apparatus 20 to the exterior of the pipe. The coupling members 68 are also positionable on the apparatus 20 to engage an interior of the pipe and are suitably adjustable to couple and concentrically or axially locate the apparatus 20 to the interior of the pipe. The coupling members 68 will be described in greater detail below.

Tool carrier 32 is rotatably mounted on and supported by frame 28 by a plurality of roller bearings 72. The roller bearings 72 ride in a circular bearing race 76 on the interior of tool carrier 32. An exemplary bearing race 76 and exemplary roller bearings 72 can be seen in FIGS. 10, 16, and 17 and will be described in more detail below.

The apparatus 20 also includes an advancement mechanism 80 that is adjustable into and out of a path of an advancement member 84 coupled to each tool support 48 to advance the tool 52 toward the pipe.

With continued reference to FIGS. 1-3 and further reference to FIGS. 4-8, the pipe machining apparatus 20 further includes a plurality of set-up legs or support members 88. The support members 88 are utilized during assembly, set-up, or disassembly of the pipe machining apparatus 20 or when the pipe machining apparatus 20 is not in use. The support members 88 support the apparatus 20 in an elevated position relative to the ground to inhibit components that project from the frame 28 and tool carrier 32 from contacting the ground and being damaged. Additionally, the elevation provided by the support members 88 positions the apparatus 20 in a more easily accessible and ergonomic position for assembly, set-up, and disassembly of the apparatus 20.

In the illustrated exemplary embodiment, the apparatus 20 includes twelve total support members 88 with each section 24A, 24B, 24C, 24D including three support members 88. Alternatively, the apparatus 20 as a whole can include any number of support members 88 and, moreover, each section 24A, 24B, 24C, 24D may include any number of support members 88, and all of such possibilities are intended to be within the spirit and scope of the present disclosure.

With particular reference to FIGS. 5-8, the plurality of support members 88 are substantially identical in structure and operation. Thus, only one of the support members 88 will be described herein in detail with the understanding that the description and drawings included herein apply to all of the support members 88 of the pipe machining apparatus 20.

Each support member 88 includes a body 92, a coupling member 96, a resilient member 100, a pad 104, and an adjustable member 108. The body 92 is generally cylindrical in shape and defines a cavity 112 therein (see FIG. 8). The coupling member 96 is also generally cylindrical in shape, is smaller in width/diameter than the body 92 to provide a lip or shoulder, and defines a longitudinal aperture 120 there through in fluid communication with the cavity 112. The coupling member 96 is positioned in the cavity 112 at a first end of the body 92 and is coupled to the body 92 with a portion of the coupling member 96 projecting beyond the first end of the body 92. The coupling member 96 may couple to the body 92 in a variety of different manners such as, for example, press-fit, interference-fit, friction-fit, welding, bonded, or any other manner of coupling. In other exemplary embodiments, the coupling member 96 may be unitarily formed as one-piece with the body 92. The portion of the coupling member 96 extending beyond the body 92 is positioned within a corresponding frame aperture 124 defined in the frame 28 of the apparatus 20. The resilient member 100 is positioned within a groove 128 defined in the coupling member 96 and projects slightly beyond a circumference of the coupling member 96. In the illustrated exemplary embodiment, the resilient member 100 is an O-ring. Alternatively, the resilient member 100 may be a wide variety of other members all of which are intended to be within the spirit and scope of the present disclosure. The frame aperture 124, the coupling member 96, and the resilient member 100 are all cooperatively sized and configured to provide an airtight seal between the resilient member 100 and an inner surface of the frame aperture 124 and to provide sufficient friction between the resilient member 100 and the inner surface of the frame aperture 124 to secure the support member 88 to the frame 28. A user must apply a desired amount of force to the support member 88 in a direction away from the frame 28 and out of the frame aperture 124 to remove the support member 88 from the frame aperture 124. The body 92 defines an internal threading 132 at the second end thereof for threadably receiving an externally threaded portion 136 of the adjustable member 108. The adjustable member 108 may be threaded into or out of the body 92 to adjust a length of the support member 88, thereby providing the capability to adjust a height of the apparatus 20 off of a ground surface. This height adjustability may provide the capability of ensuring the apparatus 20 is level or horizontal on uneven ground. That is, the length of the plurality of support members 88 may be individually adjusted to accommodate uneven ground and overall ensure the apparatus 20 is level or horizontal. The adjustable member 108 also includes a pad member 140 that is generally spherical or hemispherical in shape and is received within a receptacle 144 in the pad 104. The pad 104 is movable relative to the adjustable member 108 about three axes (similar to a ball-and-socket coupling), thereby allowing the support member 88 to accommodate uneven ground and ensure the support member 88 extends generally vertical while the pad 104 may not be horizontal. The pad 104 is adapted to engage the ground and provides a relatively wide surface area of engagement to ensure sturdiness.

When inserting the coupling member 96 into the frame aperture 124, air present in the frame aperture 124 needs to be exhausted therefrom to make room for the coupling member 96. The airtight seal created between the resilient member 100 and the inner surface of the frame aperture 124 does not allow air to exhaust from the frame aperture 124 around a circumference of the coupling member 96. If air is not allowed to exhaust from the frame aperture 124 when inserting the coupling member 96 into the frame aperture 124, the pressure may rise in the frame aperture 124 to a sufficient extent that may resist insertion of the coupling member 96. The aperture 120 defined in the coupling member 96 is in fluid communication with the cavity 112 defined in the body 92. As the coupling member 96 inserts into the frame aperture 124, the air exhausts from the frame aperture 124 through the aperture 120 defined in the coupling member 96 and into the cavity 112. The cavity 112 is sufficiently sized to accommodate the air exhausting from the frame aperture 124 to ensure that the pressure does not rise to a sufficient level to resist insertion of the coupling member 96 into the frame aperture 124. By the support member 88 accommodating the air within the frame aperture 124, complete insertion of the coupling member 96 into the frame aperture 124 is ensured.

Referring now to FIGS. 1, 2, 9, and 10, an exemplary coupling member 68 is illustrated. As indicated above, the plurality of coupling members 68 are adapted to couple the apparatus 20 to a pipe. In the embodiment illustrated in FIGS. 1, 2, 9, and 10, the coupling members 68 are positioned to couple the apparatus 20 to an exterior surface of a pipe. Alternatively, the coupling members 68 may be coupled to the frame 28 in reverse orientation to couple the apparatus 20 to an interior surface of a pipe.

Figure 9:
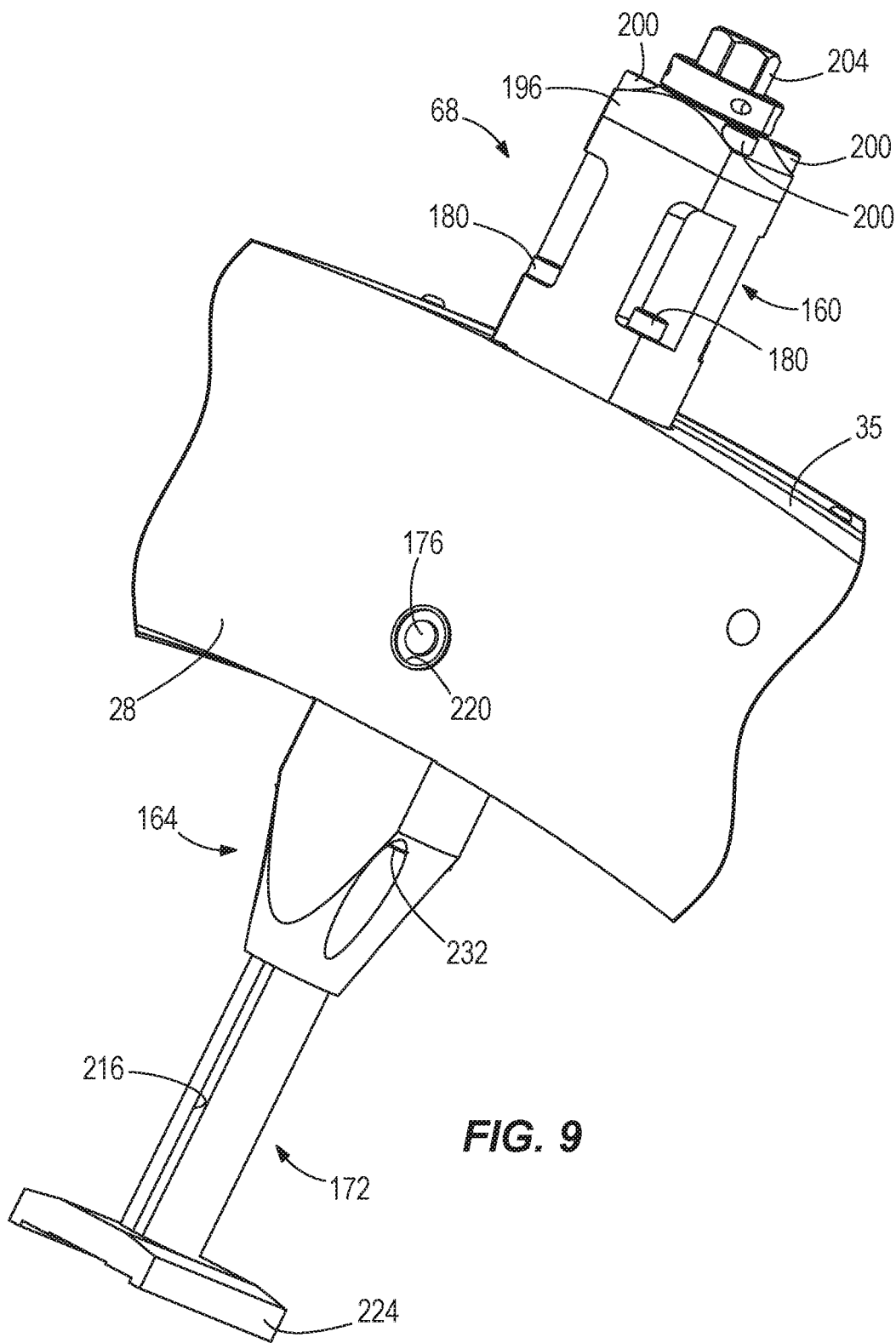
FIG. 9 is a rear perspective view of an exemplary coupling member of the pipe machining apparatus illustrated in FIG. 1 shown in a first position for coupling the pipe machining apparatus to an outer surface of a pipe, in accordance with one embodiment.
Figure 10:
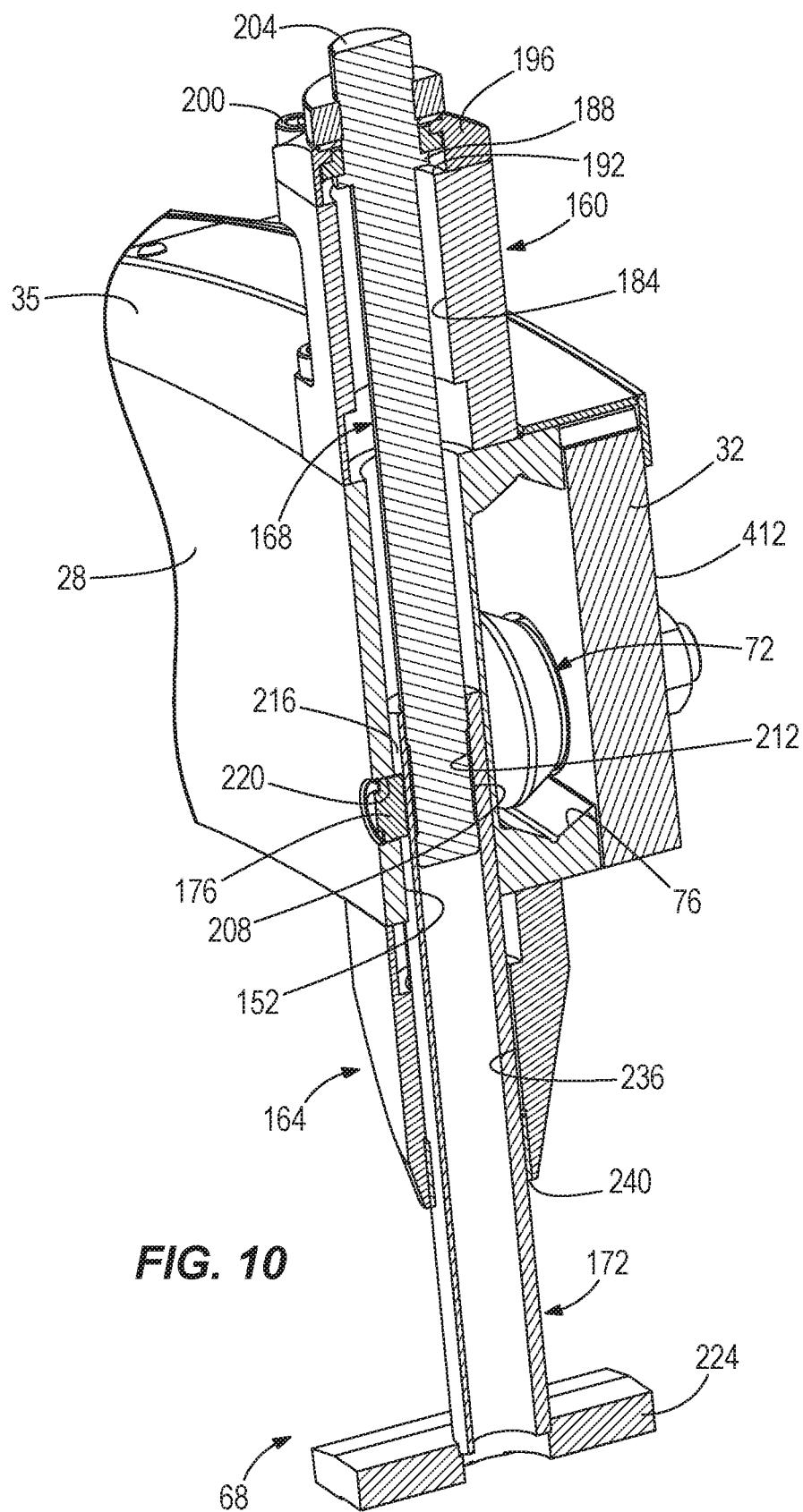
FIG. 10 is a cross-sectional view of the coupling member illustrated in FIG. 9, the cross-section is taken along a plane parallel to a longitudinal extent of the coupling member and through a center of the coupling member, in accordance with one embodiment.

Referring now to FIGS. 9 and 10, a single coupling member 68 is illustrated. The coupling members 68 are substantially identical in structure and operation. Thus, only one of the coupling members 68 will be described herein in detail with the understanding that the description and drawings included herein apply to all the coupling members 68 of the pipe machining apparatus 20.

The coupling member 68 is coupled to the frame 28 and extends through an opening 152 defined through the frame 28. Moreover, the longitudinal extent of the coupling member 68 is oriented radially to a central axis 156 of the apparatus 20. The coupling member 68 includes a first support member 160, a second support member 164, a body member 168, a sleeve 172, and a guide member 176. The first support member 160 is coupled to the periphery or circumference 35 of the frame 28 via fasteners 180 and defines a cavity 184 therein adapted to receive the body member 168 therein. A first end of the body member 168 includes a projection 188 captured between a shoulder 192 and a cap 196 of the first support member 160 to couple the first end of the body member 168 to the first support member 160. The cap 196 is secured in place via a plurality of fasteners 200. The first end of the body member 168 also includes a tool engagement member 204 adapted to be engaged by a tool for rotation of the body member 168. The second end of the body member 168 includes external threads 208 coupled with internal threads 212 defined in an interior surface of the sleeve 172. A groove 216 is defined in an outer surface of the sleeve 172 and the guide member 176 is positioned within the groove 216 to allow translation of the sleeve 172 along the body member 168, but prevent rotation of the sleeve 172 relative to the frame 28. The guide member 176 and the groove 216 are complementarily shaped to ensure a snug fit of the guide member 176 within the groove 216. This snug fit inhibits rotation of the sleeve 172 relative to the frame 28. The guide member 176 is rigidly secured to the frame 28 within an aperture 220 defined in the frame 28. In the illustrated exemplary embodiment, the groove 216 has a "V" shape and the guide member 176 has a complementary wedge shape that snuggly fits in the "V" shaped groove 216. Alternatively, the groove 216 and the guide member 176 may have other complementary shapes such as, for example, square, rectangular, other polygonal shapes, or any other configuration, as long as the interaction between the groove 216 and the guide member 176 allow translation of the sleeve 172 along the body member 168 and prevent rotation of the sleeve 172 relative to the frame 28. The sleeve 172 also includes a foot member 224 at a second end of the sleeve 172. The foot member 224 is adapted to engage a surface of the pipe. The foot member 224 is also adapted to couple to and support a pad (described in more detail below with respect to FIGS. 30-32) engageable with a surface of a pipe rather than the foot member 224 engaging a surface of the pipe. The foot member 224 and the pad may have a variety of different shapes and be made of a wide variety of materials depending on the type and size of pipe to which the apparatus 20 will be coupled.

The second support member 164 is coupled to an inner surface 244 of the frame 28 via fasteners 232 and defines a cavity 236 there through in which the sleeve 172 is positioned. An end 240 of the cavity 236 is complementary in size and shape to an outer circumference of the sleeve 172 to provide lateral support to the sleeve 172. The engagement between the second support member 164 and the sleeve 172 at the end 240 of the second support member 164 occurs a distance beyond the inner surface 244 of the frame 28, thereby providing support to the sleeve 172 a greater distance from the frame 28. Without the second support member 164, lateral support of the sleeve 172 would stop at the inner surface 244 of the frame 28. Thus, the second support member 164 provides additional lateral support to the sleeve 172 and decreases the opportunity for bending or deformation of the sleeve 172 due to lateral forces.

The length of the coupling member 68 is adjustable to accommodate different diameter pipes. To adjust the length of the coupling member 68, a user engages a tool with the tool engagement member 204 of the body member 168 and rotates the body member 168 in a desired direction to either shorten or lengthen the length of the coupling member 68. Rotation of the body member 168 causes the body member 168 to rotate relative to the frame 28 and the first support member 160. The threaded coupling between the body member 168 and the sleeve 172 causes the sleeve 172 to translate relative to the body member 168. The engagement between the guide member 176 and the groove 216 in the sleeve 172 allows the sleeve 172 to translate, but prevents the sleeve 172 from rotating with the body member 168 relative to the frame 28. Rotating the body member 168 in one direction causes the sleeve 172 to retract from a pipe and into the aperture 220 defined in the frame 28, and rotating the body member 168 in the other direction cause the sleeve 172 to extend toward a pipe and out of the aperture 220. Use of the second support member 164 is desirable in instances where the apparatus 20 is coupled to small diameter pipes and the sleeve 172 projects a greater distance out of the aperture 220 from the frame 28 (as shown in FIGS. 9 and 10).

Figure 11:
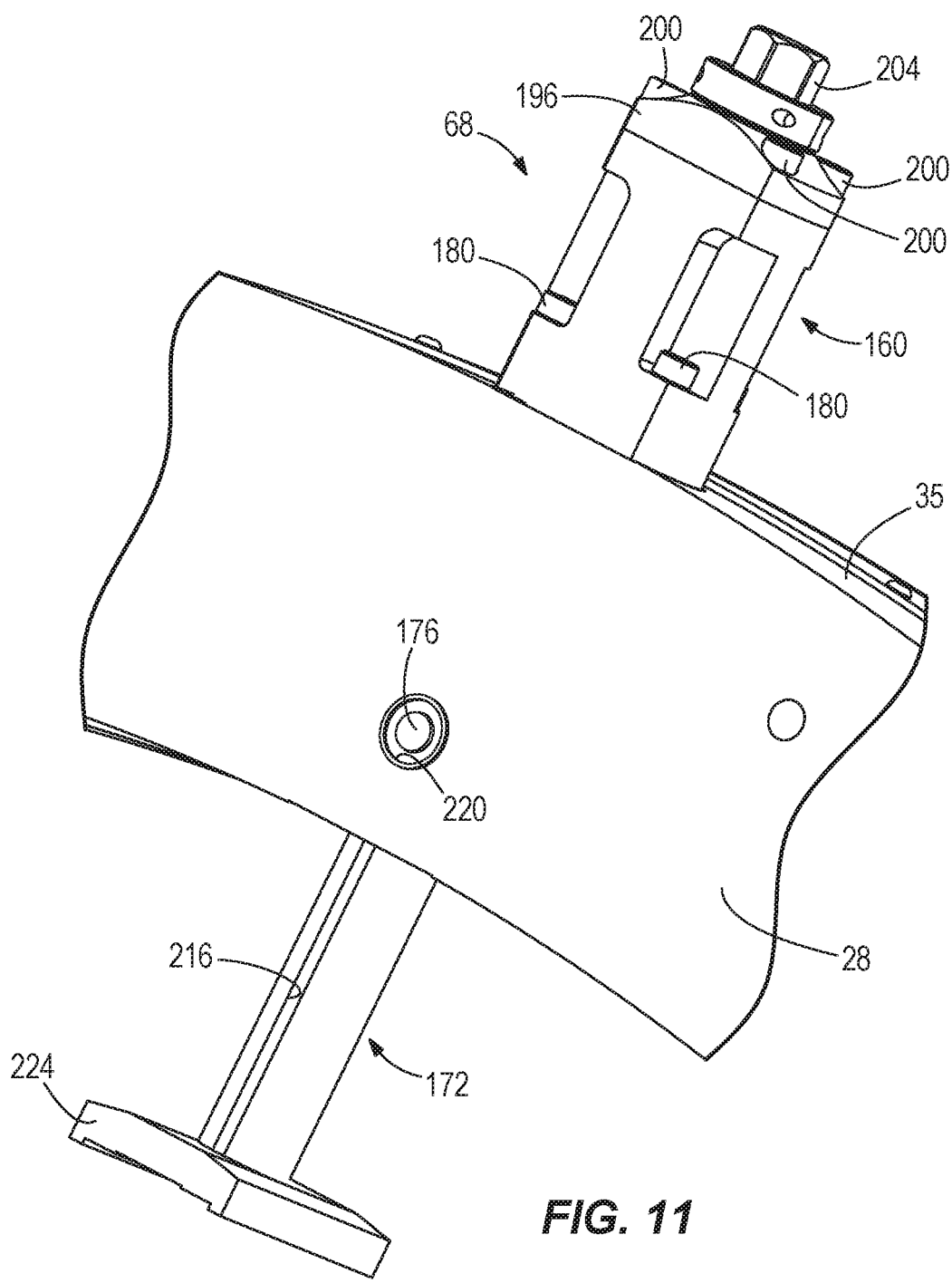
FIG. 11 is a rear perspective view of another exemplary coupling member of the pipe machining apparatus illustrated in FIG. 1 shown in a first position for coupling the pipe machining apparatus to an outer surface of a pipe, in accordance with one embodiment.

Referring now to FIG. 11, the apparatus 20 may couple to larger diameter pipes, which requires the sleeve 172 to extend a shorter distance out of the aperture 220 from the frame 28. In such instances, the second support member 164 may not be required. The additional support provided by the second support member 164 may not be required when the sleeve 172 extends a short distance from the inner surface 244 of the frame 28. Moreover, in some instances where the diameter of a pipe is very similar to a central opening of the apparatus 20 defined by inner surface 244 of the frame 28, the sleeve 172 may need to be retracted well into the aperture 220 in the frame 28. In such instances, the second support member 164 would prevent the sleeve 172 from retracting into the aperture 220 the necessary amount to accommodate such a large diameter pipe and therefore the second support member would not be used.

Figure 12:
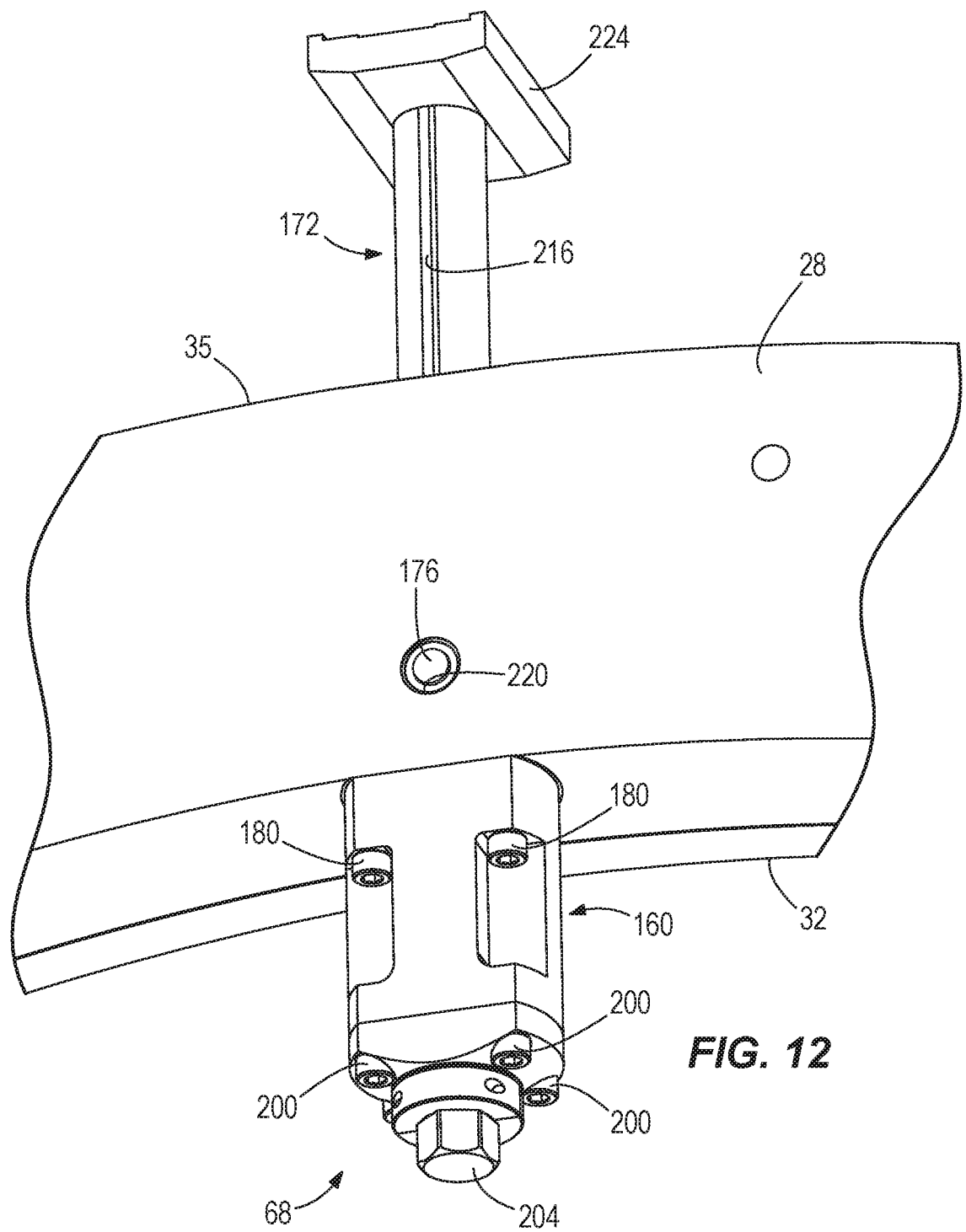
FIG. 12 is a rear perspective view of the coupling member illustrated in FIG. 11 shown in a second position for coupling the pipe machining apparatus to an inner surface of a pipe, in accordance with one embodiment.
Figure 13:
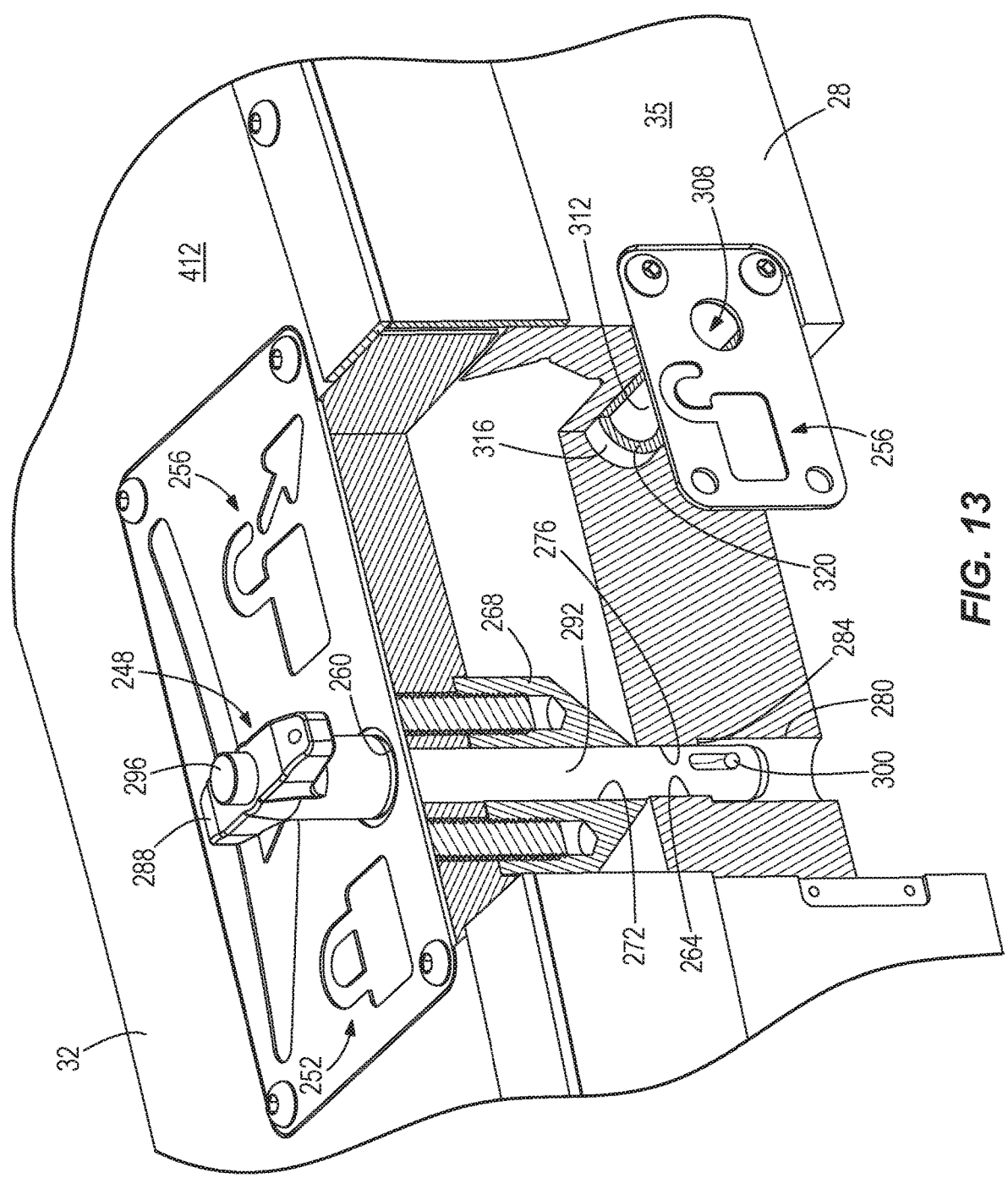
FIG. 13 is a perspective view of a portion of the pipe machining apparatus illustrated in FIG. 1 shown with a portion of the pipe machining apparatus broken away to illustrate a locking member, in accordance with one embodiment.
Figure 14:
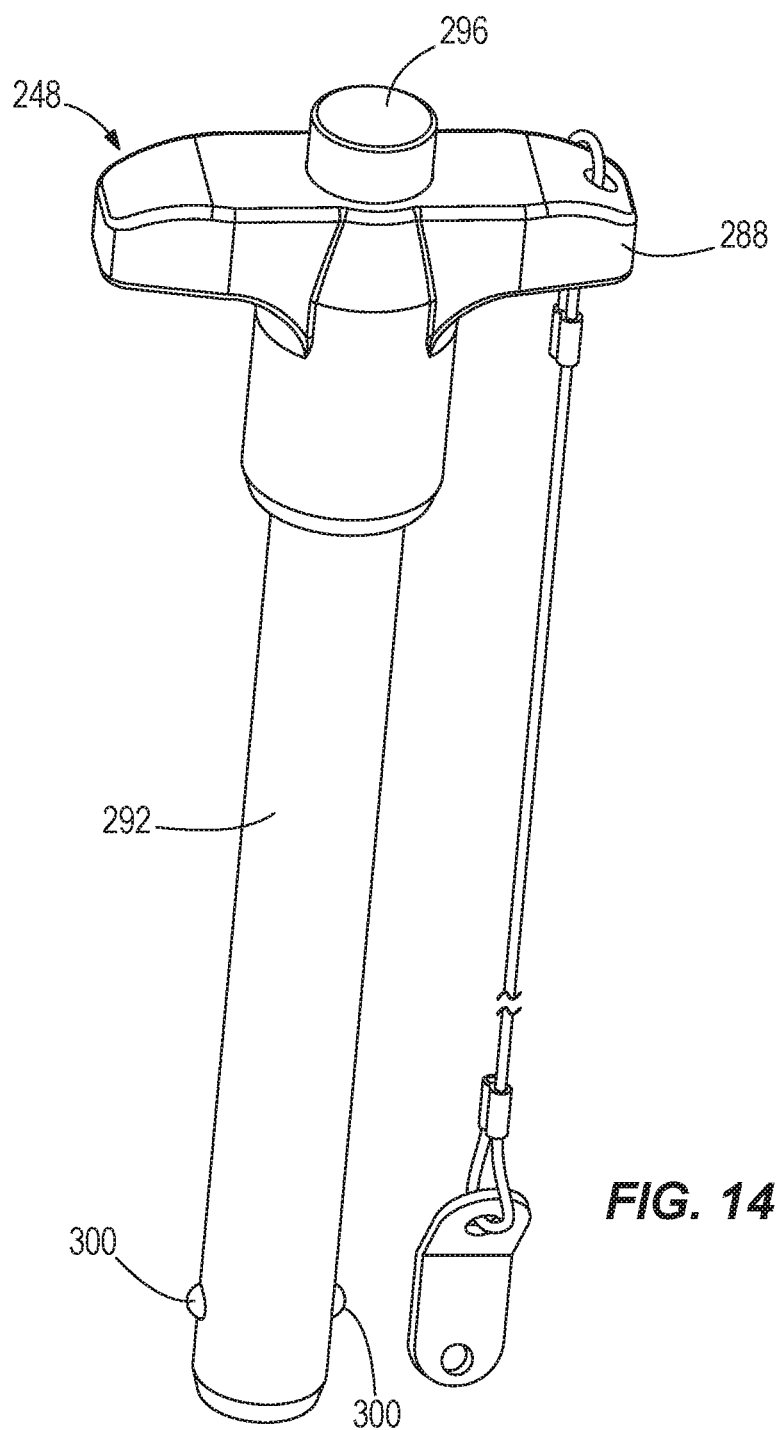
FIG. 14 is a perspective view of the locking member illustrated in FIG. 13, in accordance with one embodiment.
Figure 15:
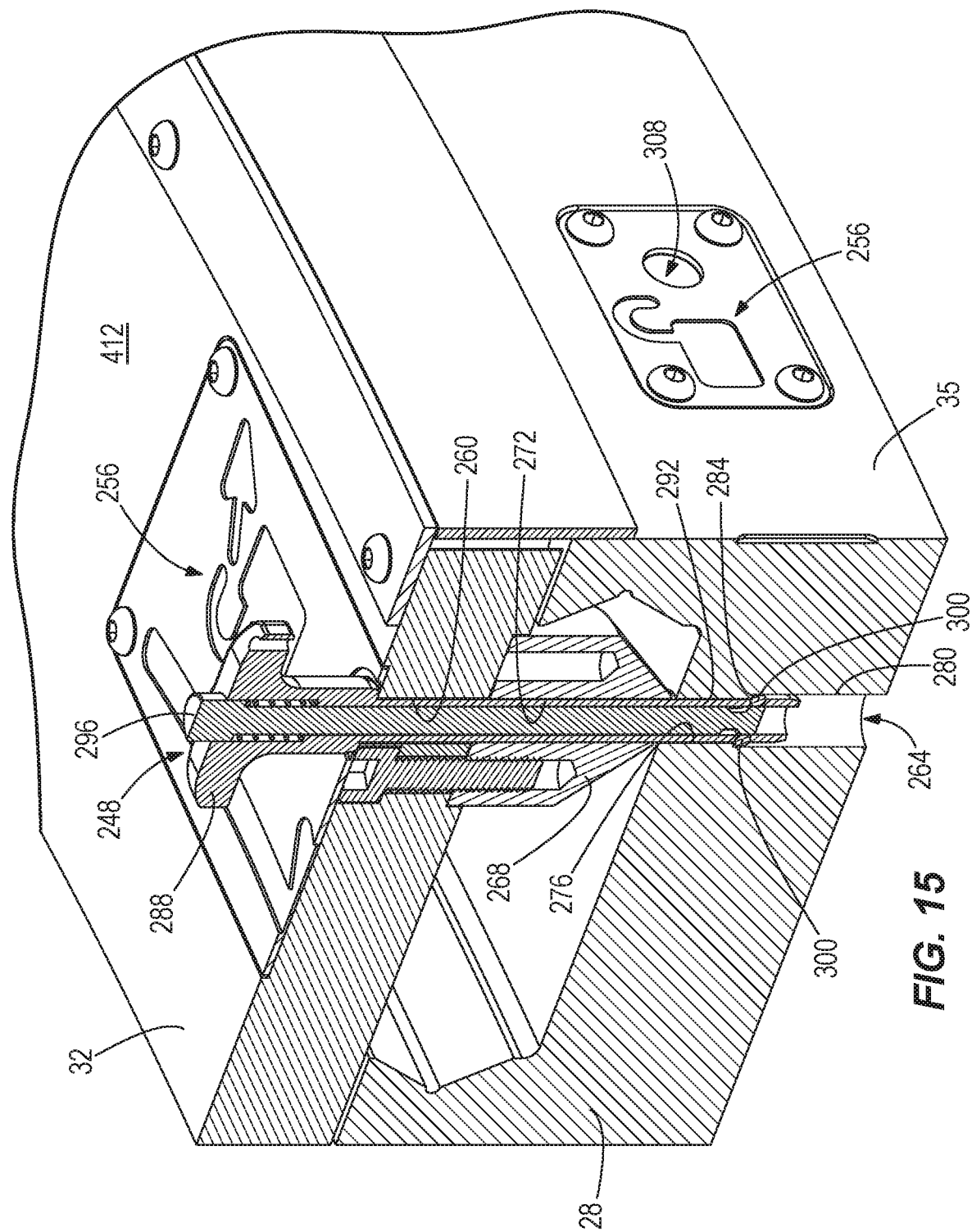
FIG. 15 is a cross-sectional view of a portion of the pipe machining apparatus and the locking member illustrated in FIG. 13, in accordance with one embodiment.

As indicated above, the coupling members 68 may be coupled to the frame 28 in a reverse orientation or position to that illustrated in FIGS. 1, 2, and 9-11 in order to couple the apparatus 20 to an inner surface of a pipe. With reference to FIG. 12, an exemplary coupling member 68 is coupled to the frame 28 in a reverse position in order to couple the apparatus 20 to an inner surface of the pipe. In this position, the first support member 160 is coupled to the inner surface 244 of the frame 28 and the sleeve 172 extends out of the aperture 220 and beyond the circumference 35 of the frame 28 to position the foot member 224 externally of the frame 28 for engagement with an inner surface of a pipe. A second support member 164 is not illustrated in FIG. 12. However, a second support member 164 may be utilized with the coupling member 68 in this position and would be coupled to the circumference 35 of the frame 28. In this position, the length of the coupling member 68 is adjusted in the same manner as previously described.

Referring now to FIGS. 1 and 13-15, a locking member 248 is illustrated for preventing movement of the tool carrier 32 relative to the frame 28. It may be desirable to prevent the tool carrier 32 from moving relative to the frame 28 during assembly, set-up, or disassembly of the apparatus 20, and/or when the apparatus 20 is not in use. When the apparatus 20 is being assembled or disassembled, the apparatus 20 is in a plurality of separated sections 24A, 24B, 24C, 24D with open ends. The tool carrier portions included in each section may rotate relative to and slide out of the frame portions included in each section. It is desirable to have the tool carrier portions and the frame portions remain together and not move relative to each other during assembly of the sections 24A, 24B, 24C, 24D. The locking member 248 prevents the tool carrier 32 from moving relative to the frame 28. In the illustrated exemplary embodiment (see FIG. 1), two of the sections 24B, 24D include the locking member 248. Alternatively, any number of the sections may include locking members 248.

The locking member 248 is movable between a locked position, in which the tool carrier 32 is prevented from moving relative to the frame 28, and an unlocked position, in which the tool carrier 32 is movable relative to the frame 28. The apparatus 20 includes a first indicia 252 indicating the location of the locked position and second indicia 256 indicating the location of the unlocked position. The tool carrier 32 defines a tool carrier aperture 260 near the first indicia 252 and the frame 28 defines a frame aperture 264. The apparatus 20 further includes an insert member 268 positioned between the frame 28 and the tool carrier 32 that defines an insert aperture 272 there through. The insert member 268 is fixed in position relative to the frame 28 and the insert aperture 272 always aligns with the frame aperture 264. The tool carrier 32 is movable relative to the frame 28 and, therefore, the tool carrier aperture 260 is movable relative to the aligned insert aperture 272 and frame aperture 264. The frame aperture 264 includes a first portion 276 having a first diameter and a second portion 280 having a second diameter larger than the first diameter. A shoulder 284 is provided at a transition from the first portion 276 to the second portion 280 of the frame aperture 264.

A wide variety of different types of locking members may be utilized with the apparatus 20 to prevent movement of the tool carrier 32 relative to the frame 28 and all of such possibilities are intended to be within the spirit and scope of the present disclosure. In the illustrated exemplary embodiment, the locking member 248 includes a handle 288, a housing 292, a plunger 296, a biasing member, and a pair of movable projections 300. The handle 288 is positioned at one end of the housing 292, and the handle 288 and housing 292 together define a locking member cavity 304 in which the plunger 296 is positioned. The plunger 296 is movable within the cavity 304 and biased toward the handle end of the locking member 248 by the biasing member. A user may depress the plunger 296 into the cavity 304 against the biasing force of the biasing member and the biasing member will return the plunger 296 outward to its pre-depressed position. A second end of the plunger 296 is positioned between the two projections 300 captured in openings defined in a second end of the housing 292. The projections 300 are movable relative to the housing 292 within the openings. The second end of the plunger 296 includes a first portion having a first width or diameter and a second portion having a second width or diameter less than the first width or diameter. When the plunger 296 is not depressed, the first portion of the plunger 296 is aligned with the projections 300 and the projections 300 are biased outward of the openings. When the plunger 296 is depressed, the second portion of the plunger 296 is aligned with the projections 300 and the projections 300 are capable of moving into the openings toward a center of the housing 292. The second width or diameter limits the extent to which the projections 300 may move inward.

To position the locking member 248 and the apparatus 20 in the locked position, the tool carrier aperture 260 is aligned with the already aligned frame and insert apertures 264, 272, and the locking member 248 is inserted into the aligned apertures 260, 264, 272. In some exemplary embodiments, the plunger 296 may need to be depressed to allow the projections 300 to move inward into the housing 292 to enable the locking member 248 to pass all the way into the aligned apertures 260, 264, 272. In such exemplary embodiments, the projections 300 extend sufficiently beyond the housing 292 to prevent the locking member 248 from inserting all the way into the apertures 260, 264, 272 and failure to depress the plunger 296 will maintain the projections 300 in the extended position. Once the locking member 248 is fully inserted into the aligned apertures 260, 264, 272 and the projections 300 are positioned in the second portion 280 of the frame aperture 264, the projections 300 may move outward to their extended position. With the plunger 296 in its non-depressed position, the first portion of the plunger 296 is aligned with the projections 300 and the projections 300 are biased outward of the openings. In this position, the projections 300 prevent the locking member 248 from being removed from the aligned apertures 260, 264, 272. Any effort to pull the locking member 248 out of the aligned apertures 260, 264, 272 will cause the projections 300 to engage the shoulder 284, which will prevent any further withdrawal of the locking member 248 from the aligned apertures 260, 264, 272. The locking member 248 and apparatus 20 are now in the locked position.

To move the locking member 248 and the apparatus 20 from the locked position to the unlocked position, a user depresses the plunger 296 to align the second portion of the plunger 296 with the projections 300, thereby allowing the projections 300 to move into the openings toward a center of the housing 292. The user then pulls on the locking member 248 in a direction out of the aligned apertures 260, 264, 272 which causes the projections 300 to engage the shoulder 284 and the shoulder 284 moves the projections 300 into the openings defined in the housing 292. The user is able to completely withdraw the locking member 248 from the aligned apertures 260, 264, 272 with the projections 300 in their inward or retracted positions. With the locking member 248 completely withdrawn from the aligned apertures 260, 264, 272, the locking member 248 and apparatus 20 are now in the unlocked position.

The apparatus 20 also includes a storage position for the locking member 248 when it is not in use. The storage position is near the second indicia 256 and is defined by a storage aperture 308 defined in the frame 28. The storage aperture 308 includes a first portion 312 having a first width or diameter and a second portion 316 having a second width or diameter larger than the first width or diameter. A shoulder 320 is provided at the transition from the first portion 312 and the second portion 316 of the storage aperture 308. The locking member 248 may be inserted into the storage aperture 308 in the same manner as it was inserted into the aligned apertures 260, 264, 272 at the locking position. When the locking member 248 is completely positioned in the storage aperture 308 and the projections 300 are in the second portion 316 of the storage aperture 308, the plunger 296 may be released and the projections 300 are biased outward of the openings. The locking member 248 is now in the storage position and cannot be removed unless a user depresses the plunger 296.

In some exemplary embodiments, the insert aperture 272 has a size tolerance that is tighter or closer to the size of the locking member housing 292 than the tool carrier aperture 260 and the frame aperture 264. In this manner, the tool carrier aperture 260 and the frame aperture 264 may be slightly looser around the locking member housing 292 than the insert aperture 272, and significant time and cost to provide a tightly toleranced tool carrier aperture 260 and frame aperture 264 are avoided. With the insert aperture 272 tightly toleranced to the locking member housing 292, the insert member 268 will provide lateral support to the locking member 248. It is generally more time efficient and cost effective to tightly tolerance the insert aperture 272 than the tool carrier aperture 260 and the frame aperture 264.

Figure 16:
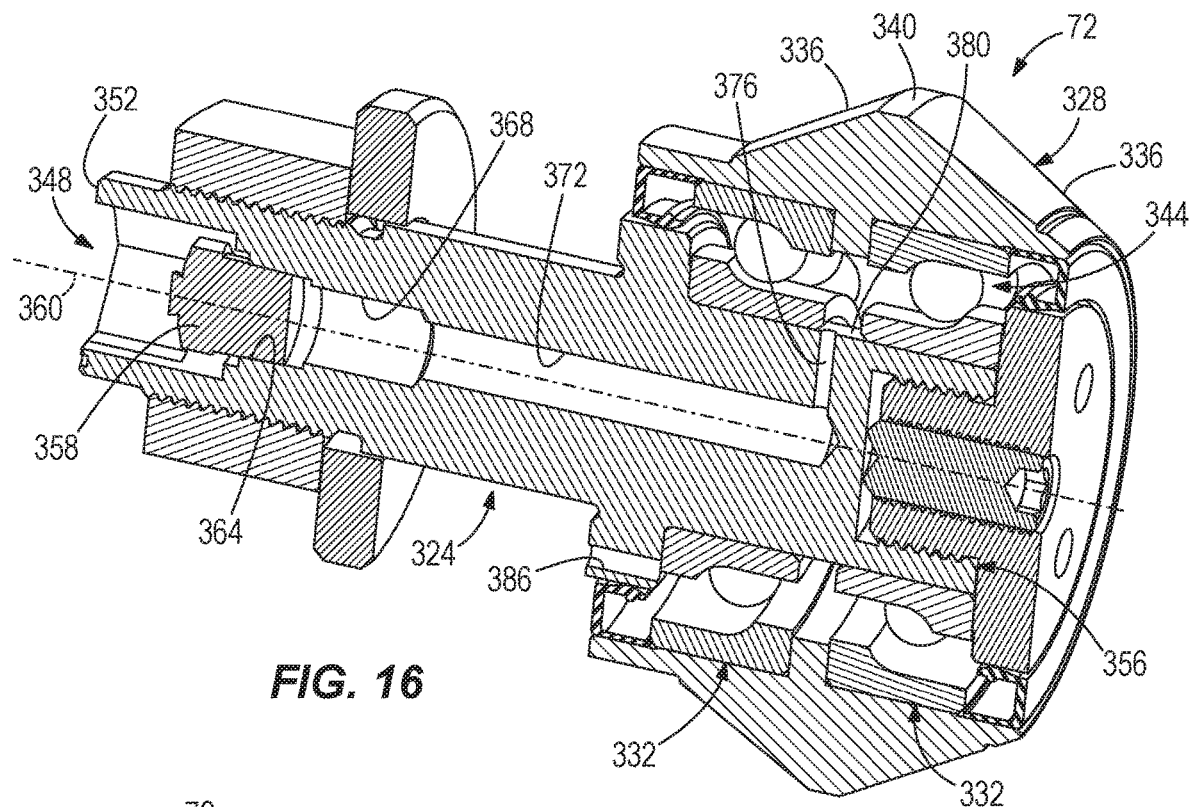
FIG. 16 is a cross-sectional view of a bearing assembly of the pipe machining apparatus illustrated in FIG. 1, the cross-section is taken along a plane parallel to a longitudinal extent of the bearing assembly and through a center of the bearing assembly, in accordance with one embodiment.
Figure 17:
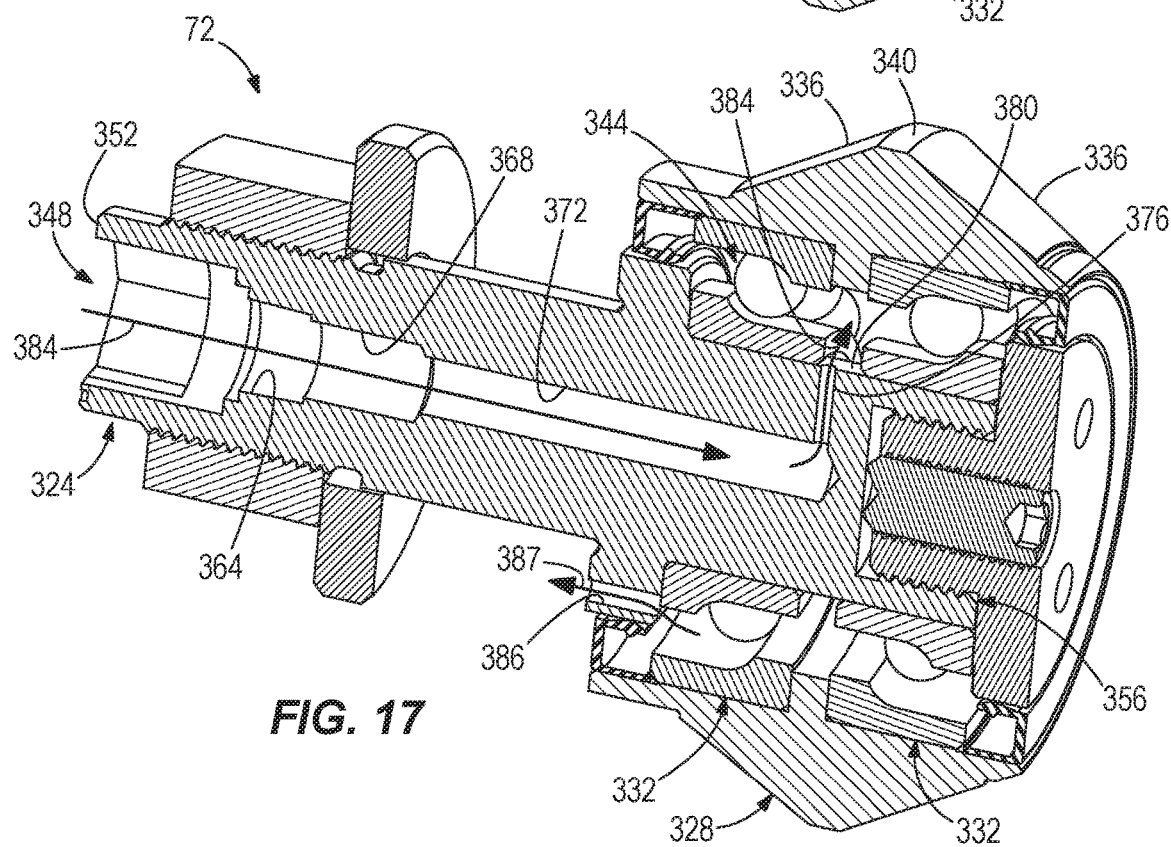
FIG. 17 is a cross-sectional view similar to FIG. 16 of the bearing assembly and illustrates an exemplary oil flow as represented by directional arrows, in accordance with one embodiment.

Referring now to FIGS. 16 and 17, an exemplary roller bearing 72 of the apparatus 20 is illustrated. The apparatus 20 includes a plurality of the roller bearings 72, but only one is illustrated herein since the roller bearings 72 are substantially identical in structure and operation.

Each roller bearing 72 includes a spindle 324, a roller 328, and a pair of bearing assemblies 332 between the spindle 324 and the roller 328. In operation, the spindle 324 is orientated generally horizontal. The spindle 324 is coupled to the tool carrier 32 and the roller 328 is positioned within the bearing race 76 to engage the frame 28. In the illustrated exemplary embodiment, the roller 328 is a "V" type roller 328 including two angled surfaces 336 and a peak or vertex 340 where the two angled surfaces 336 converge. A cavity 344 is defined between the roller 328 and the spindle 324, and the two bearing assemblies 332 are positioned within the cavity 344. The bearing assemblies 332 facilitate smooth movement of the roller 328 around the spindle 324.

The spindle 324 also defines a lubricant cavity 348 therein. The lubricant cavity 348 is defined in a first end 352 of the spindle 324, extends a substantial amount through the spindle 324 toward a second end 356 of the spindle 324, and stops short of the second end 356. A pressure relieve vent or plug 358 is positioned in the lubricant cavity 348 to seal the lubricant cavity 348 when desired and to vent excess pressure when necessary. The lubricant cavity 348 is parallel to and is centrally located in the spindle 324 about a central longitudinal axis 360. The lubricant cavity 348 is generally cylindrical in shape and includes a first portion 364 having a first diameter, a second portion 368 having a second diameter less than the first diameter, a third portion 372 having a third diameter less than the first and second diameters, and a fourth portion 376 having a forth diameter less than the first, second, and third diameters. The fourth portion 376 is positioned near the second end 356 of the lubricant cavity 348 and extends generally perpendicular to the central longitudinal axis 360 of the spindle 324. The fourth portion 376 is defined in a side surface 380 of the spindle 324 and is in fluid communication with the cavity 344 between the spindle 324 and the roller 328.

The configuration of the lubricant cavity 348 illustrated herein is merely an exemplary configuration and the lubricant cavity 348 is capable of having a wide variety of different configurations, with all of such possibilities intended to be within the spirit and scope of the present disclosure. For example, the lubricant cavity 348 may include any number of portions (including one portion) having any size diameters. Also, for example, the lubricant cavity 348 can have different shapes other than cylindrical (which has a circular cross-sectional shape) including, but not limited to, a square cross-sectional shape, triangular cross-sectional shape, oval cross-sectional shape, or any other polygonal or arcuately perimetered cross-sectional shape.

With particular reference to FIG. 17, the pressure relief vent 358 is removed and lubricant is injected into the lubricant cavity 348 at the first end 352 of the spindle 324 and the lubricant flows into the lubricant cavity 348, as depicted by arrows 384. A desired amount of lubricant is introduced into the lubricant cavity 348 to provide the roller bearing 72 with sufficient lubrication. The fourth portion 376 of the lubricant cavity 348 facilitates lubricant flow into the cavity 344 defined between the spindle 324 and the roller 328, which allows the bearing assemblies 332 to be lubricated. An overflow aperture 386 is defined in the spindle 324 to allow excess lubricant to flow there through, as depicted by arrow 387, out of the cavity 348. The overflow aperture 386 is in fluid communication with the cavity 348. In some exemplary embodiments, it may be desirable to only partially fill the lubricant cavity 348. For example, it may be desirable to fill the lubricant cavity 348 approximately half way. After the lubricant cavity 348 is sufficiently filled, the pressure relief vent 358 is inserted into the lubricant cavity 348.

Figure 18:
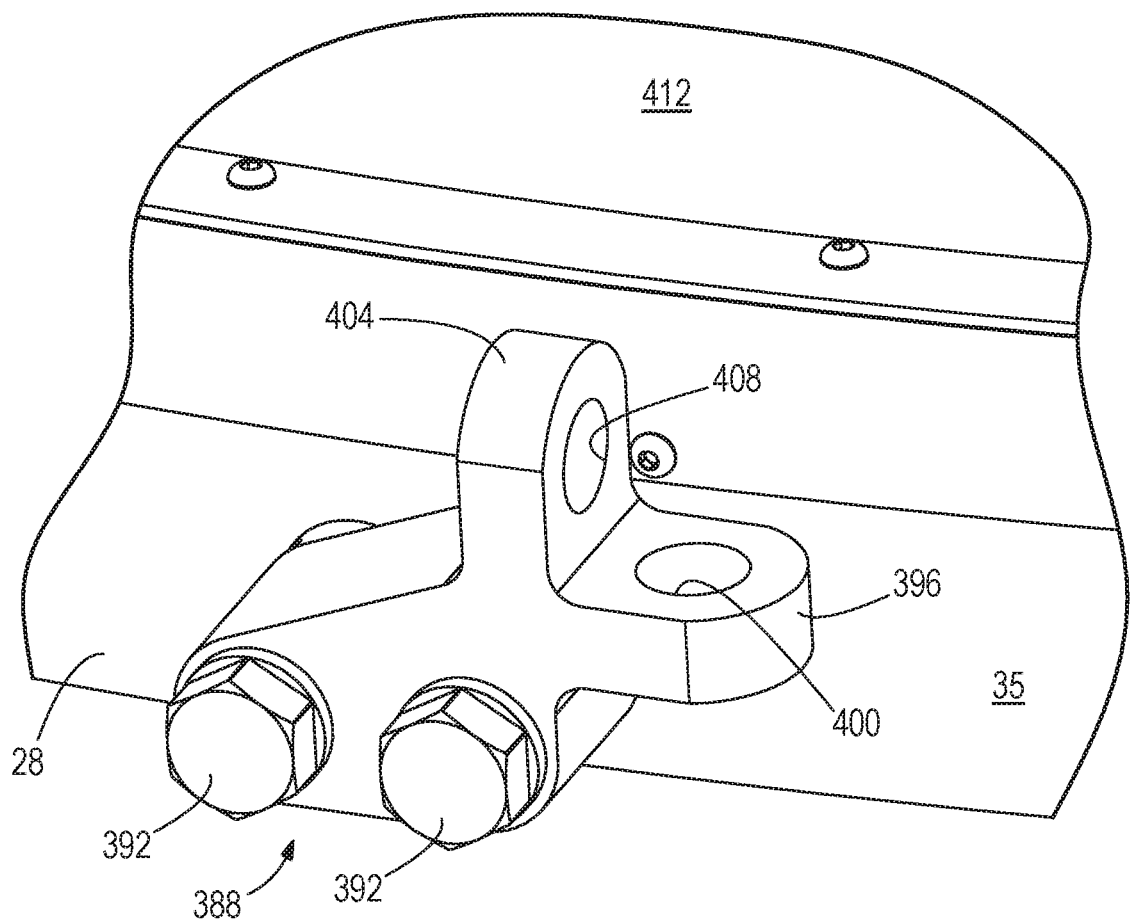
FIG. 18 is a perspective view of an exemplary support member of the pipe machining apparatus illustrated in FIG. 1, in accordance with one embodiment.
Figure 19:
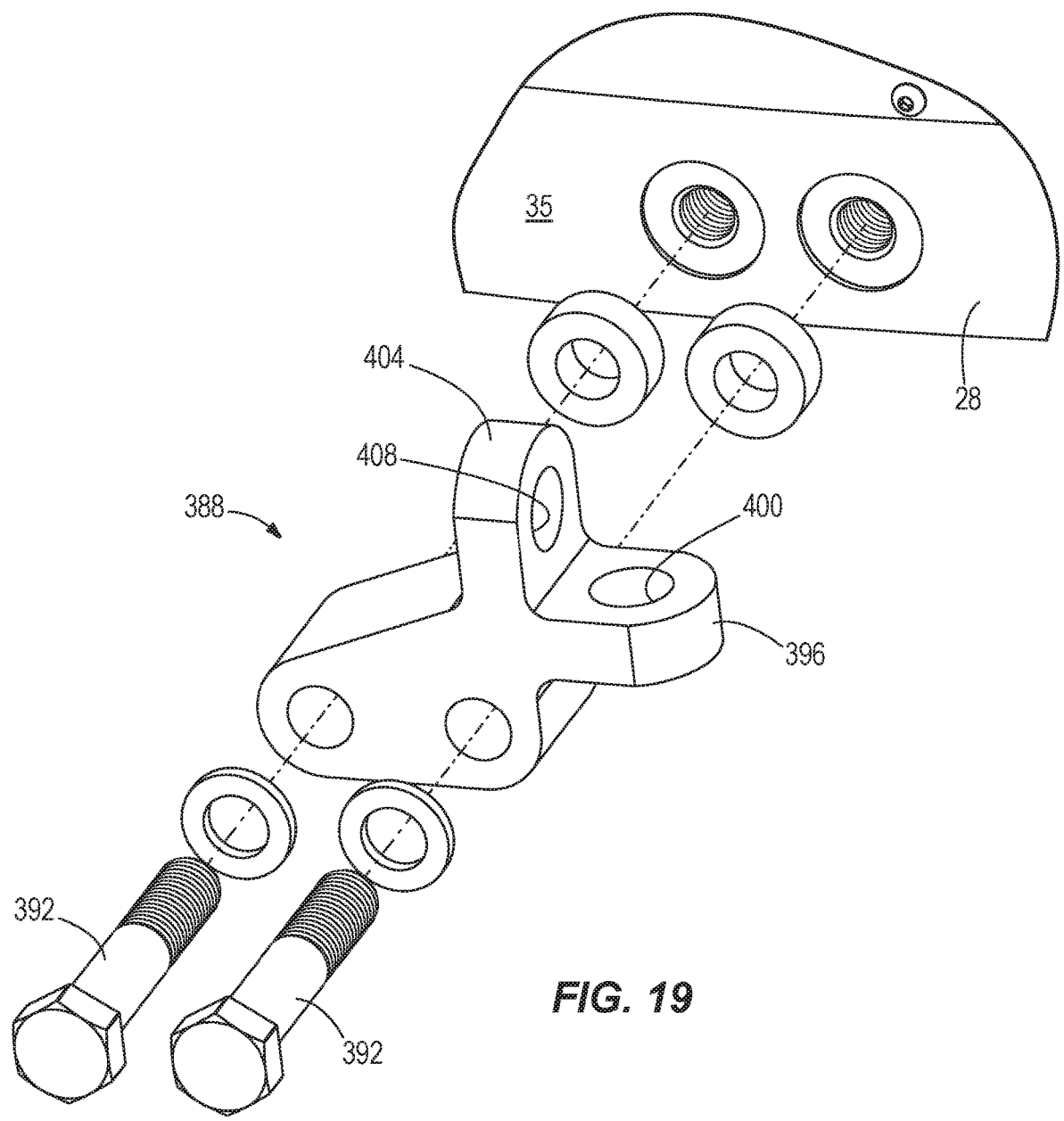
FIG. 19 is an exploded view of the support member illustrated in FIG. 18, in accordance with one embodiment.
Figure 20:
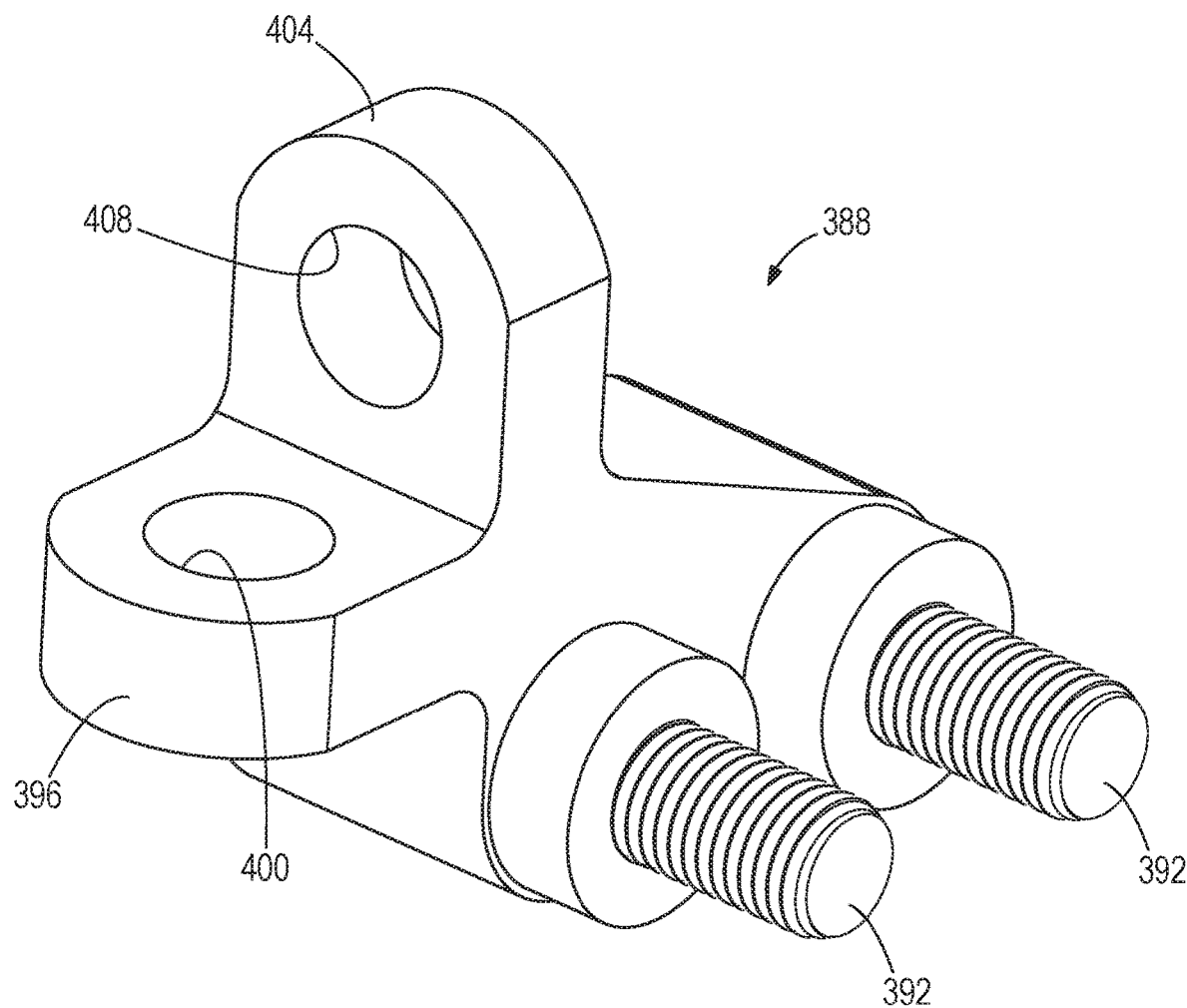
FIG. 20 is another perspective view of the support member illustrated in FIG. 18, in accordance with one embodiment.

Referring now to FIGS. 18-20, an exemplary support member 388 of the apparatus 20 is illustrated. The apparatus 20 includes a plurality of support members 388 coupled to the periphery or circumference 35 of the frame 28. In the illustrated exemplary embodiment, the apparatus 20 includes eight total support members 388 with two support members 388 coupled to each section 24A, 24B, 24C, 24D. In other exemplary embodiments, the apparatus 20 may, as a whole, include any number of support members 388 and may include any number of support members on each section 24A, 24B, 24C, 24D. The support members 388 are substantially identical in structure and operation. Thus, only one of the support members 388 will be described herein in detail with the understanding that the description and drawings included herein apply to all of the support members 388 of the pipe machining apparatus 20.

Each support member 388 is rigidly coupled to the frame 28 with a pair of fasteners 392. The support member 388 includes a first flange 396 defining a first aperture 400 there through and a second flange 404 defining a second aperture 408 there through. The first flange 396 and the second flange 404 are generally perpendicular to each other. The first flange 396 is generally parallel to a front surface 412 of the tool carrier 32 and generally perpendicular to the central axis 156 of the apparatus 20. The second flange 404 is generally perpendicular to the front surface 412 of the tool carrier 32 and extends parallel to the central axis 156 of the apparatus 20.

As indicated above, in the illustrated exemplary embodiment, each section 24A, 24B, 24C, 24D includes two support members 388. The support members 388 on each section are generally mirror images of each other about a vertical plane extending along the central axis 156. The support members 388 are used during assembly, set-up, disassembly, and manipulation of the apparatus 20. The support members 388 provide much flexibility and make it easier when assembling, setting-up, disassembling, and manipulating the apparatus 20. The apparatus 20 and components thereof may be lifted and manipulated with a variety of different types of powered lifting mechanisms. Moreover, a variety of different types of hardware may be used between the apparatus 20 and the lifting mechanisms to couple the apparatus 20 to the lifting mechanisms. The exemplary lifting mechanisms and hardware described and illustrated herein are not intended to be limiting upon the present disclosure.

Referring now to FIGS. 21-25, exemplary uses of the support members 388 during assembly, set-up, disassembly, and manipulation of the apparatus 20 will be described and illustrated.

Figure 21:
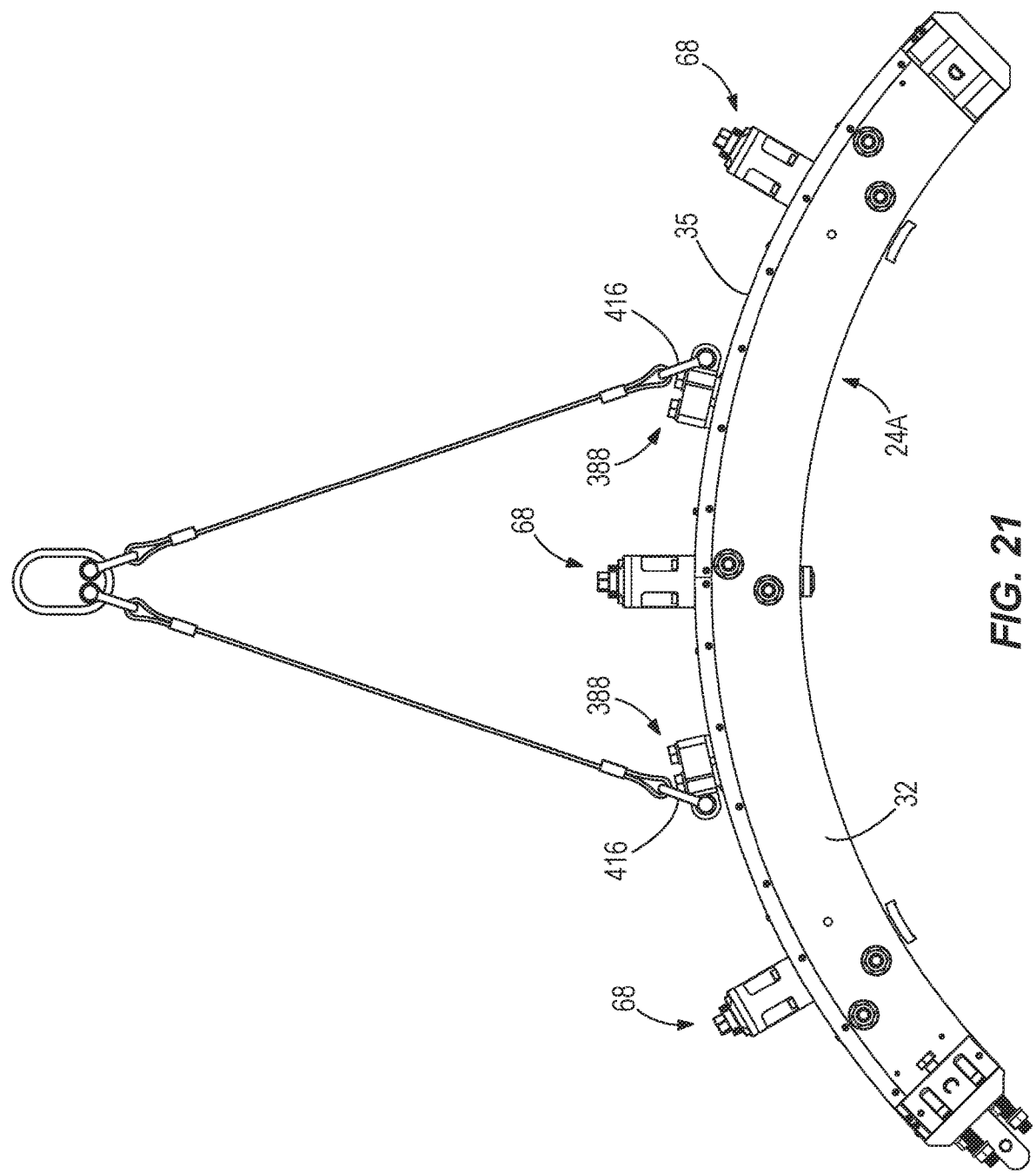
FIG. 21 is an elevational view of an exemplary rigging position associated with one section of the pipe machining apparatus illustrated in FIG. 1, the section of the pipe machining apparatus is oriented in a vertical position, in accordance with one embodiment.

With particular reference to FIG. 21, a single section 24A of the apparatus 20 is illustrated and is shown being lifted in a vertical position. Exemplary hardware for coupling the section 24 to a lifting mechanism is illustrated and is not intended to be limiting. The exemplary hardware includes a pair of coupling members 416 coupled to the first flanges 396 of the support members 388. The support members 388 are appropriately positioned on the section 24A to position a center of gravity of the section 24A equidistantly between the support members 388 to ensure the section 24A is lifted in a level manner as illustrated in FIG. 21.

Figure 22:
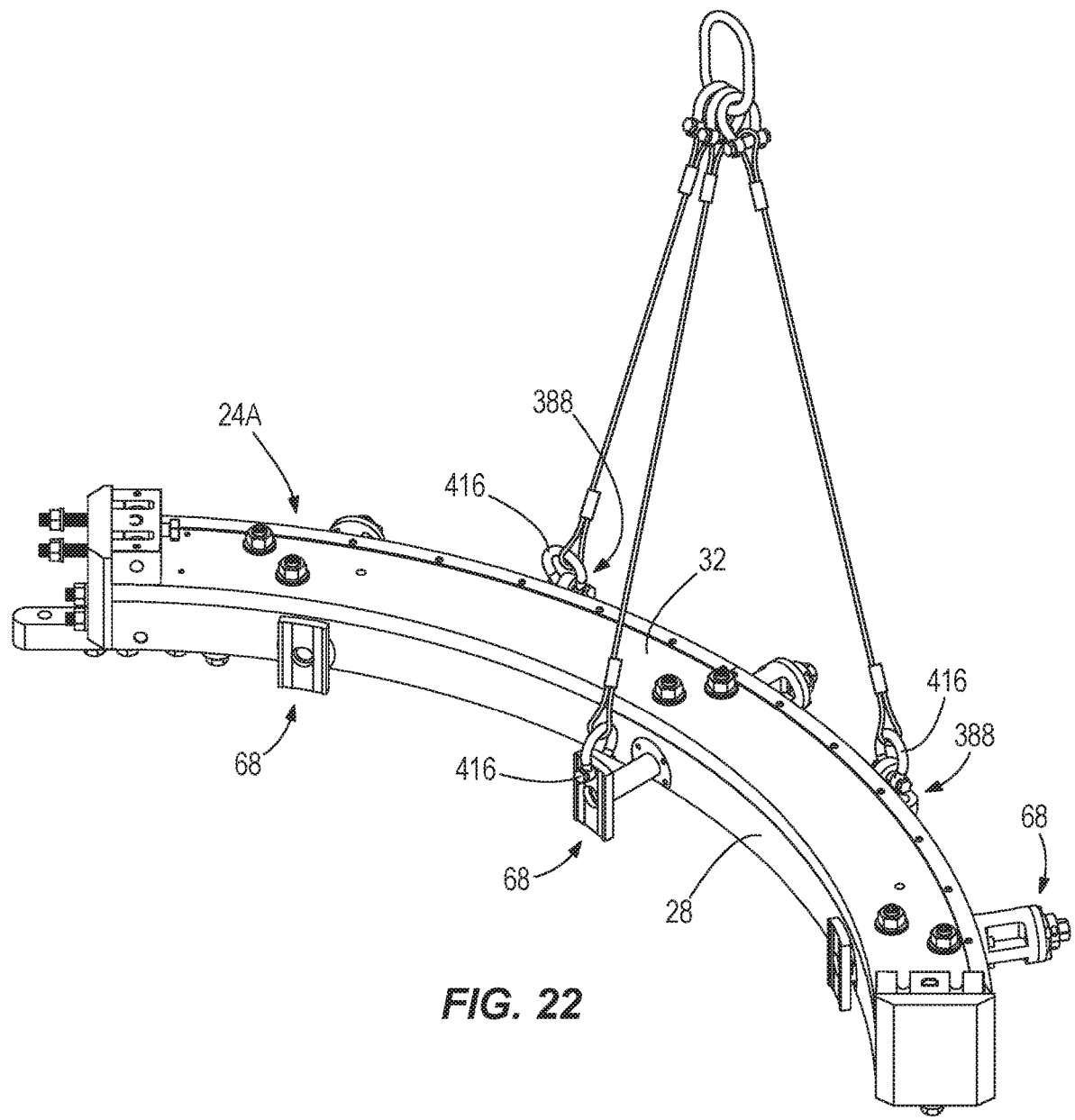
FIG. 22 is a top perspective view of another exemplary rigging position associated with one section of the pipe machining apparatus illustrated in FIG. 1, the section of the pipe machining apparatus is oriented in a horizontal position, in accordance with one embodiment.

Referring now to FIG. 22, the support members 388 also provide the capability of lifting the apparatus 20 and components thereof in horizontal positions as well as vertical positions. FIG. 22 illustrates a single section 24A of the apparatus 20 being lifted in a horizontal position. Exemplary hardware for coupling the section 24A to a lifting mechanism is illustrated and is not intended to be limiting. The exemplary hardware includes two coupling members 416 coupled to the second flanges 404 of the support members 388 and one of the coupling members 416 coupled to the coupling member 68. The support members 388 and coupling member 68 are positioned on the section 24A to appropriately position a center of gravity of the section 24A to ensure the section 24A is lifted in a level manner as illustrated in FIG. 22.

Figure 23:
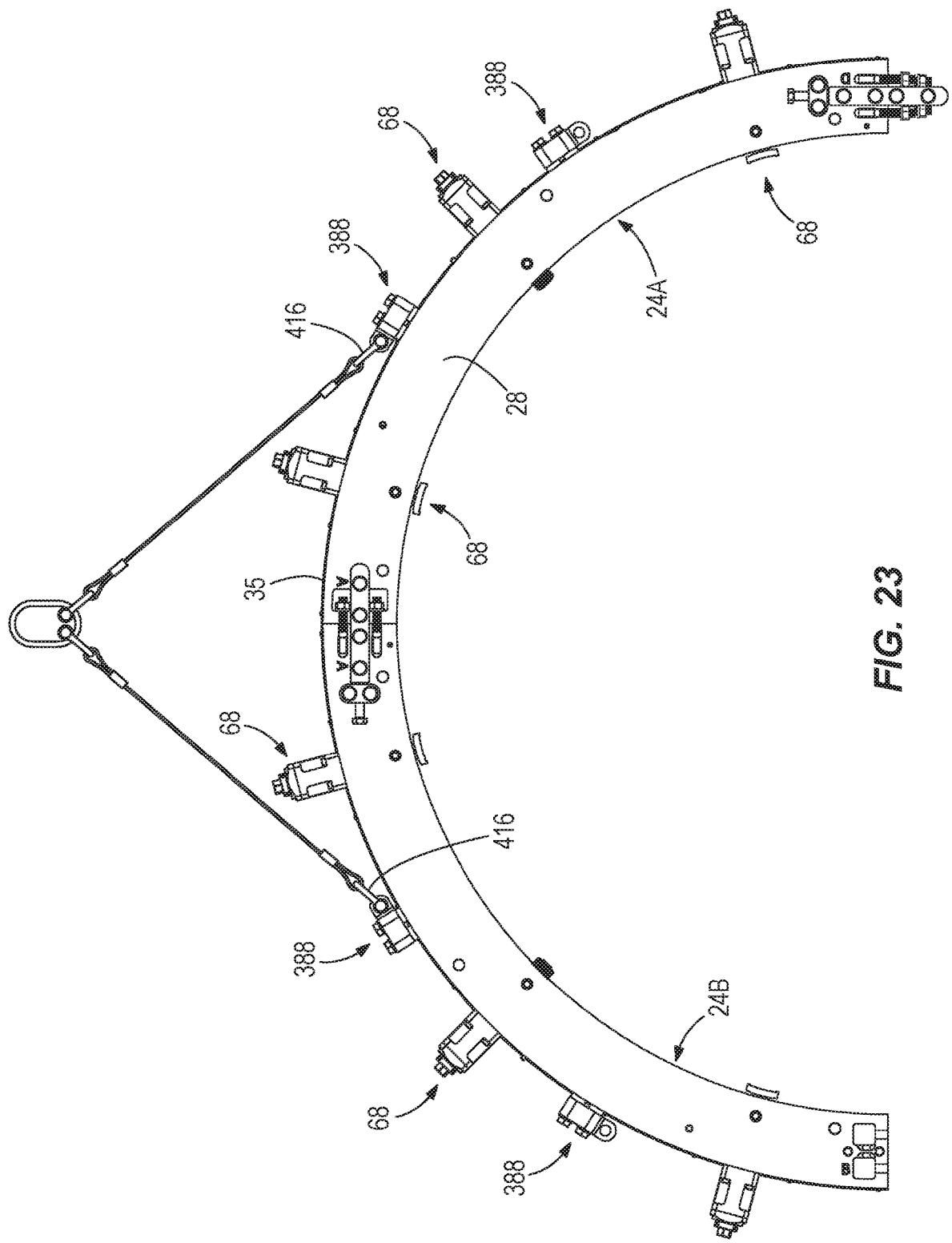
FIG. 23 is an elevational view of a further exemplary rigging position associated with two sections of the pipe machining apparatus illustrated in FIG. 1, the two sections of the pipe machining apparatus are oriented in a vertical position, in accordance with one embodiment.

With particular reference to FIG. 23, two coupled together sections 24A, 24B of the apparatus 20 are illustrated and are shown being lifted in a vertical position. Exemplary hardware for coupling the two sections 24A, 24B to a lifting mechanism is illustrated and is not intended to be limiting. The exemplary hardware includes a pair of coupling members 416 with one coupling member 416 coupled to a first flange 396 of one of the support members 388 on the first section 24A and the other coupling member 416 is coupled to a first flange 396 of one of the support members 388 on the second section 24A. The support members 388 are appropriately positioned on the sections 24A, 24B to position a center of gravity of the coupled together sections 24A, 24B equidistantly between the support members 388 to ensure the sections 24A, 24B are lifted in a level manner as illustrated in FIG. 23.

Figure 24:
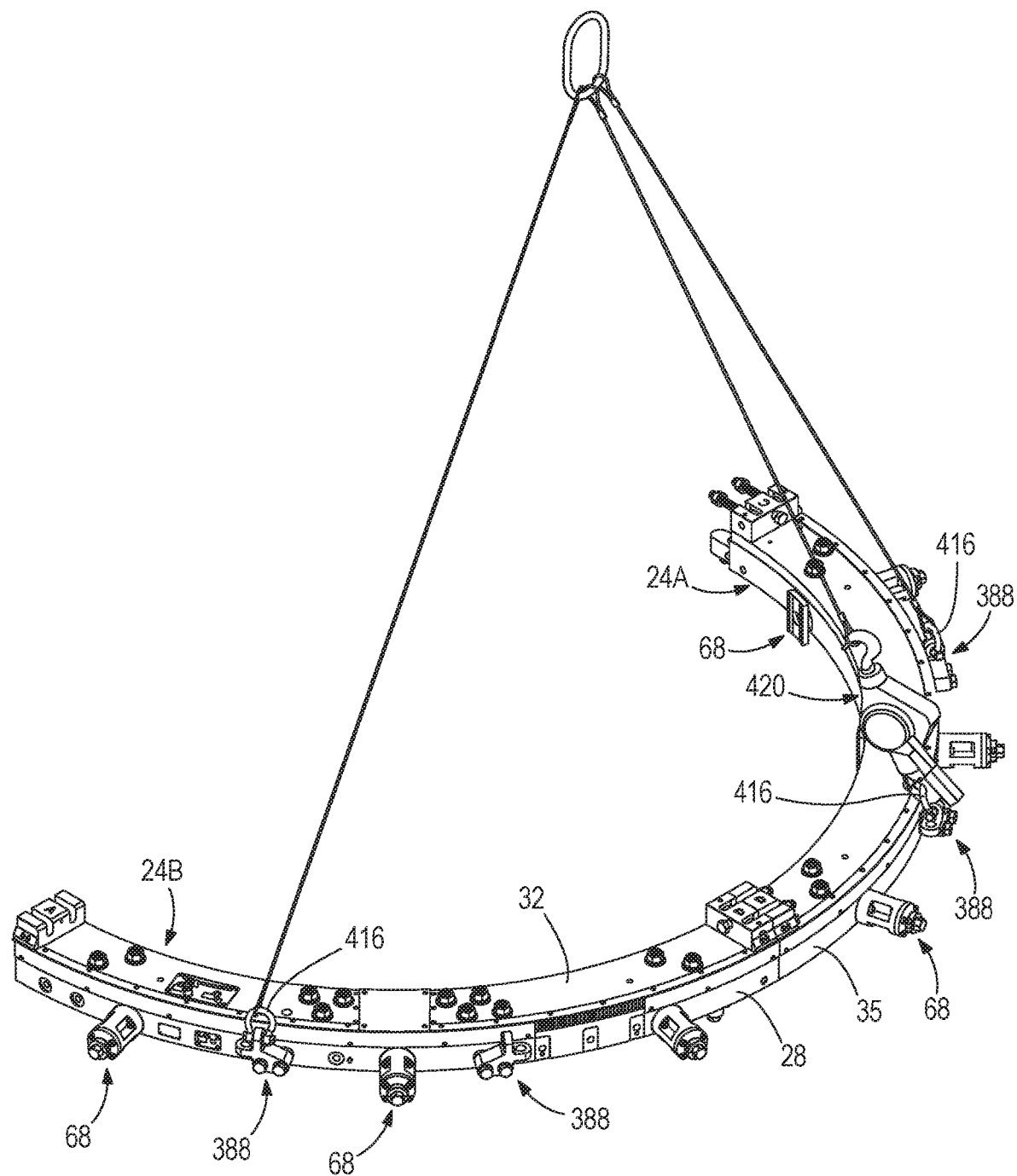
FIG. 24 is a top perspective view of still another exemplary rigging position associated with two sections of the pipe machining apparatus illustrated in FIG. 1, the two sections of the pipe machining apparatus are oriented in a horizontal position, in accordance with one embodiment.

Referring now to FIG. 24, two coupled together sections 24A, 24B of the apparatus 20 are illustrated and are shown being lifted in a horizontal position. Exemplary hardware for coupling the two sections 24A, 24B to a lifting mechanism is illustrated and is not intended to be limiting. The exemplary hardware includes three coupling members 416 with two of the coupling members 416 coupled to the second flanges 404 of the support members 388 on the first section 24A, and the third coupling member 416 coupled to the second flange 404 of one of the support members 388 on the second section 24B. A winch or a come-along 420 is also illustrated in FIG. 24. The support members 388 are appropriately positioned on the two sections 24A, 24B to appropriately position a center of gravity of the coupled together sections 24A, 24B to ensure the two sections 24A, 24B are lifted in a level manner as illustrated in FIG. 24.

Figure 25:
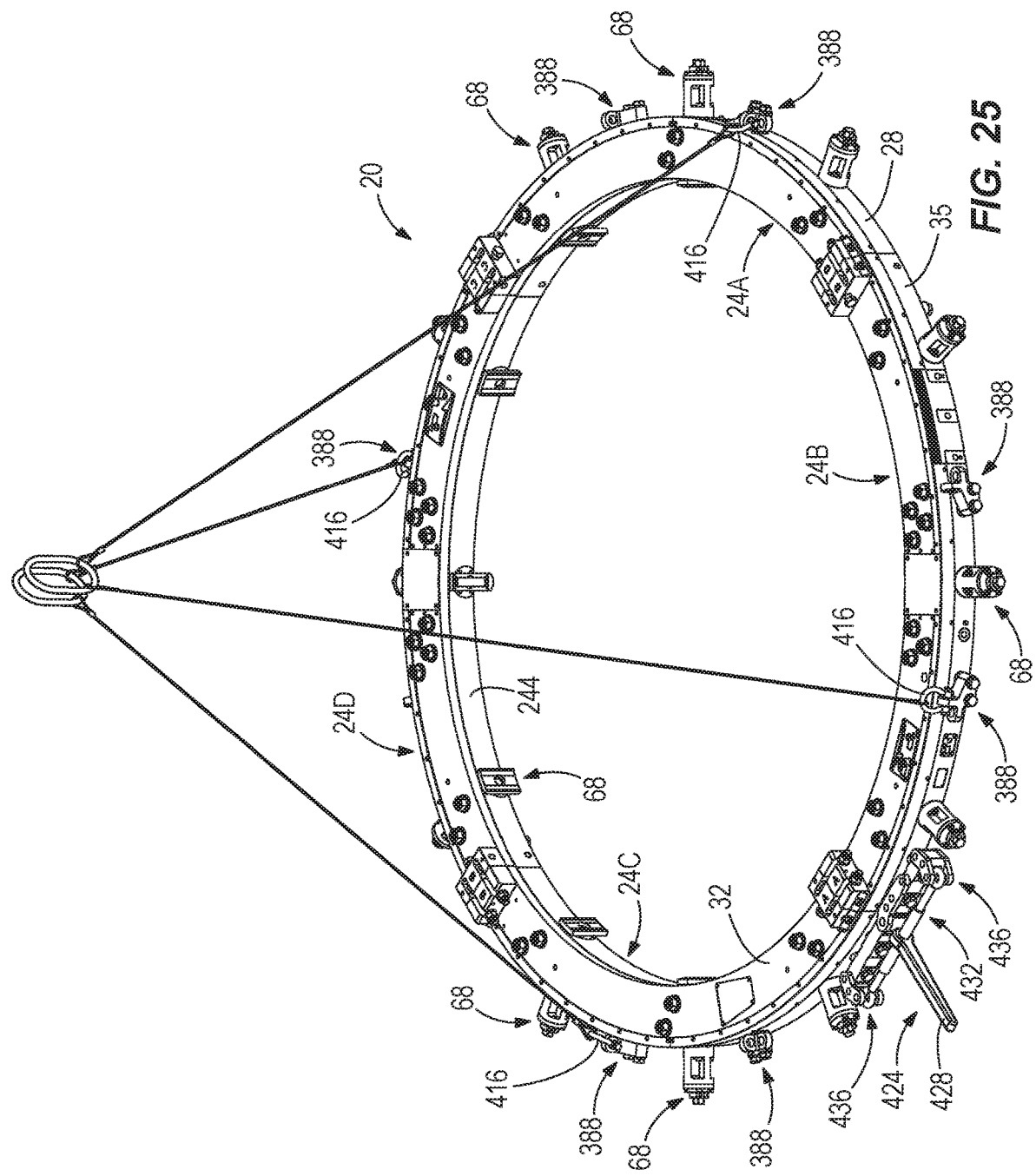
FIG. 25 is a top perspective view of still a further exemplary rigging position associated with the entire pipe machining apparatus illustrated in FIG. 1, the pipe machining apparatus is oriented in a horizontal position, in accordance with one embodiment.

Referring now to FIG. 25, a completely assembled apparatus 20 is illustrated including four coupled together sections 24A, 24B, 24C, 24D. The apparatus 20 is shown being lifted in a horizontal position. Exemplary hardware for coupling the apparatus 20 to a lifting mechanism is illustrated and is not intended to be limiting. The exemplary hardware includes four coupling members 416 with the coupling members 416 coupled to second flanges 404 of four of the support members 388 on the apparatus 20. The coupling members 416 are coupled to one of the support members 388 on each section 24A, 24B, 24C, 24D. The support members 388 are appropriately positioned on the four sections 24A, 24B, 24C, 24D to appropriately position a center of gravity of the coupled together sections 24A, 24B, 24C, 24D to ensure the apparatus 20 is lifted in a level manner as illustrated in FIG. 25.

It should be understood that one or more sections of the apparatus 20 or the entire assembled apparatus 20 may be lifted in a variety of manners and orientations using the support members 388, and that those manners and orientations described above and illustrated are only exemplary and are not intended to be limiting. Any and all possibilities of using the support members 388 for lifting one or more sections or the entire assembled apparatus 20 are intended to be within the spirit and scope of the present disclosure.

Referring now to FIGS. 1, 2, and 26-29, the apparatus 20 includes a hinge 424 adapted to assist with positioning the apparatus 20 around a pipe. The hinge 424 includes a lever 428, an arm member 432 (that together act as a two way ratchet member), a pair of upright flange members 436, and a pair of lateral flange members 440. The lever 428 is coupled to the arm member 432 and the arm member 432 includes a housing 444 and a pair of telescoping coupling arms 448 positioned and movable within a cavity 452 defined in the housing 444. Distal ends of the coupling arms 448 include apertures 456 there through aligned with apertures 460 defined in the upright flange members 436 and each set of aligned apertures 456, 460 are adapted to receive a fastener or coupling pin 464 there through to couple the arm member 432 to an upper end of the upright flange members 436. The coupling pin 464 allows rotation between the upright flange members 436 and the arm member 432 about the coupling pin 464. The lever 428 can be ratcheted in a first direction to pull the arms 448 inward, thereby shortening the arms 448, or may be ratcheted in a second direction to push the arms 448 outward, thereby lengthening the arms 448.

The upright flange members 436 also include apertures 468 there through that are aligned with apertures 472 defined in corresponding ends of the lateral flange members 440.

Coupling pins 476 are positioned in each set of aligned apertures 468, 472 to couple the upright flange members 436 to the lateral flange members 440. A further coupling pin 480 is positioned in aligned apertures in overlapping ends of the two lateral flange members 440. The two lateral flange members 440 are rotatable relative to each other about the coupling pin 480. The two lateral flange members 440 are each respectively coupled to the frame 28 with a pair of fasteners 484, 488. Fasteners 484 pass through round apertures defined in the respective lateral flange member 440 that are similar shaped to the diameter of the fasteners 484. Fasteners 488 pass through elongated slots 489 defined in the respective lateral flange member 440. The fasteners 488 may be unthreaded to uncouple the respective lateral flange member 440 from the frame 28 (described in more detail below).

Figure 26:
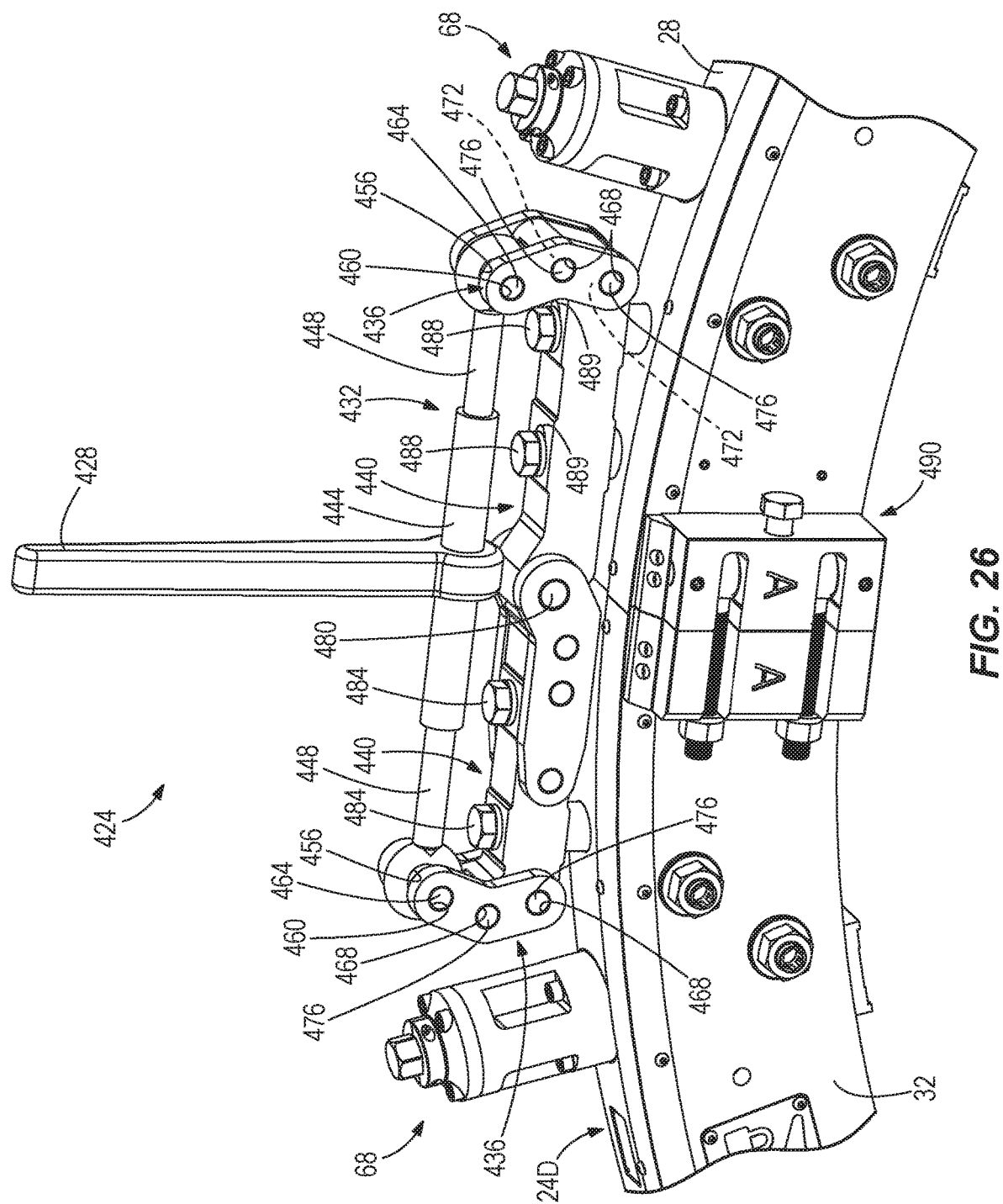
FIG. 26 is a top perspective view of a hinge of the pipe machining apparatus illustrated in FIG. 1, the hinge is shown in a coupled position, in accordance with one embodiment.

As indicated above, the hinge 424 assists with coupling the apparatus 20 around a pipe. The hinge 424 allows a completely assembled apparatus 20 to split in half and open about the hinge 424 (see FIG. 28). With particular reference to FIG. 26, the hinge 424 is shown in a first position, in which the apparatus 20 is in a closed position, both lateral flange members 440 are coupled to the frame 28 with the fasteners 484, 488, the telescoping coupling arms 448 are extended outward, the upright flange members 436 are generally vertical, and the lateral flange members 440 are generally horizontal.

Figure 27:
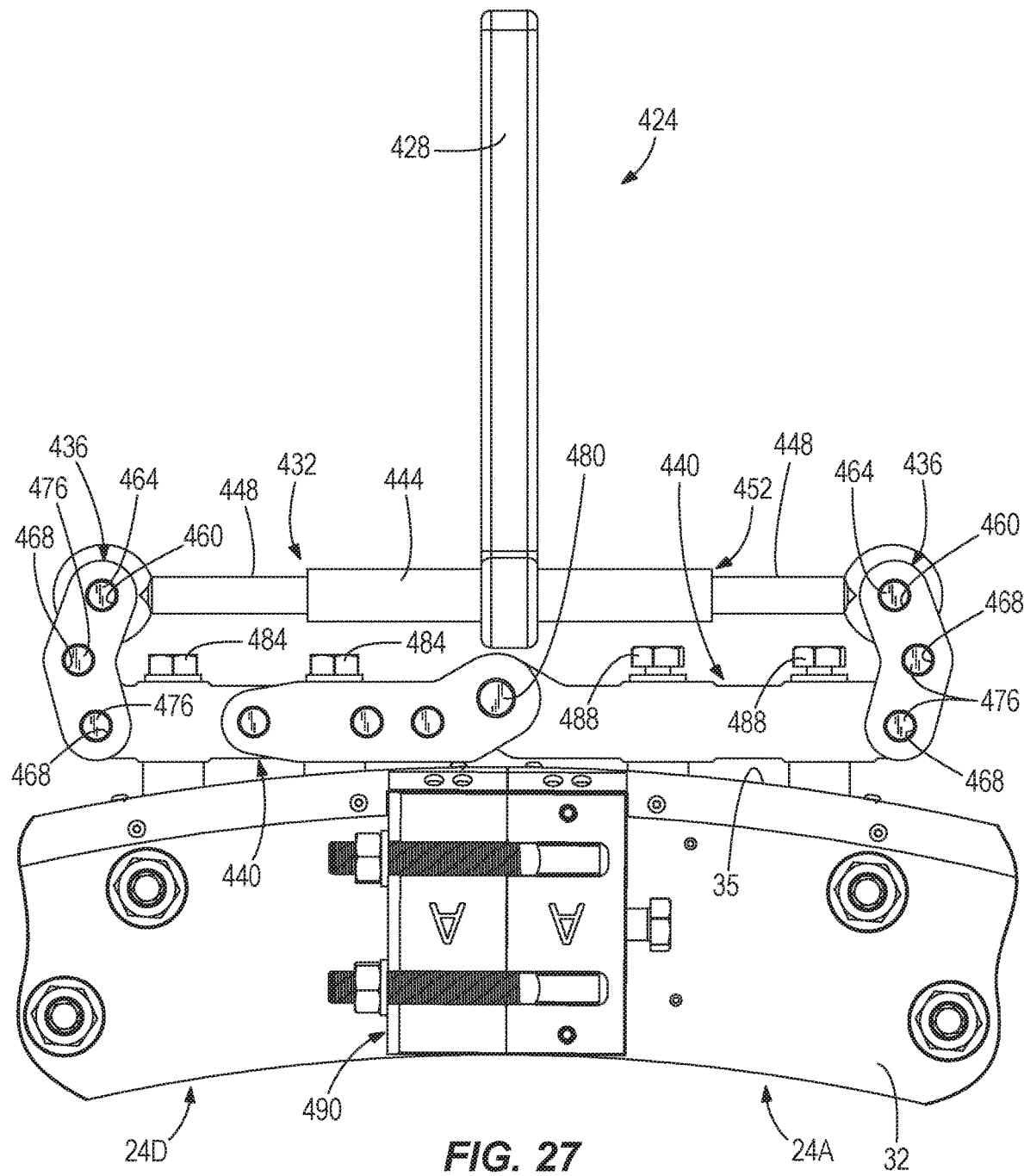
FIG. 27 is an elevational view of the hinge and the pipe machining apparatus illustrated in FIG. 26, the hinge is shown in an uncoupled position, in accordance with one embodiment.

With reference to FIG. 27, to begin opening the apparatus 20, the lateral flange member 440 associated with fasteners 488 is uncoupled from the frame 28 by loosening the associated two fasteners 488.

Figure 28:
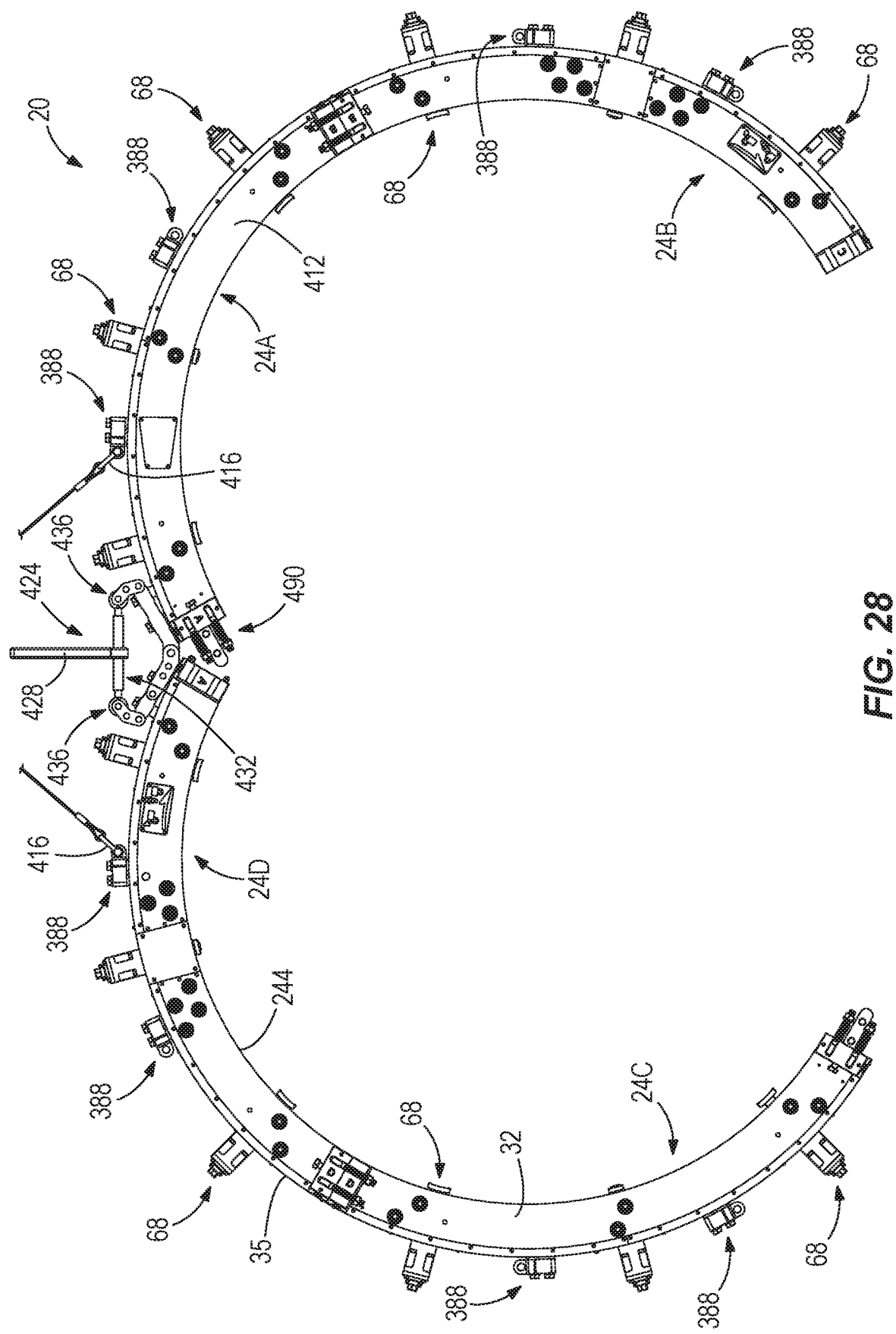
FIG. 28 is an elevational view of the hinge and the pipe machining apparatus shown in a separated and vertical position to enable the pipe machining apparatus to be placed around a pipe, in accordance with one embodiment.
Figure 29:
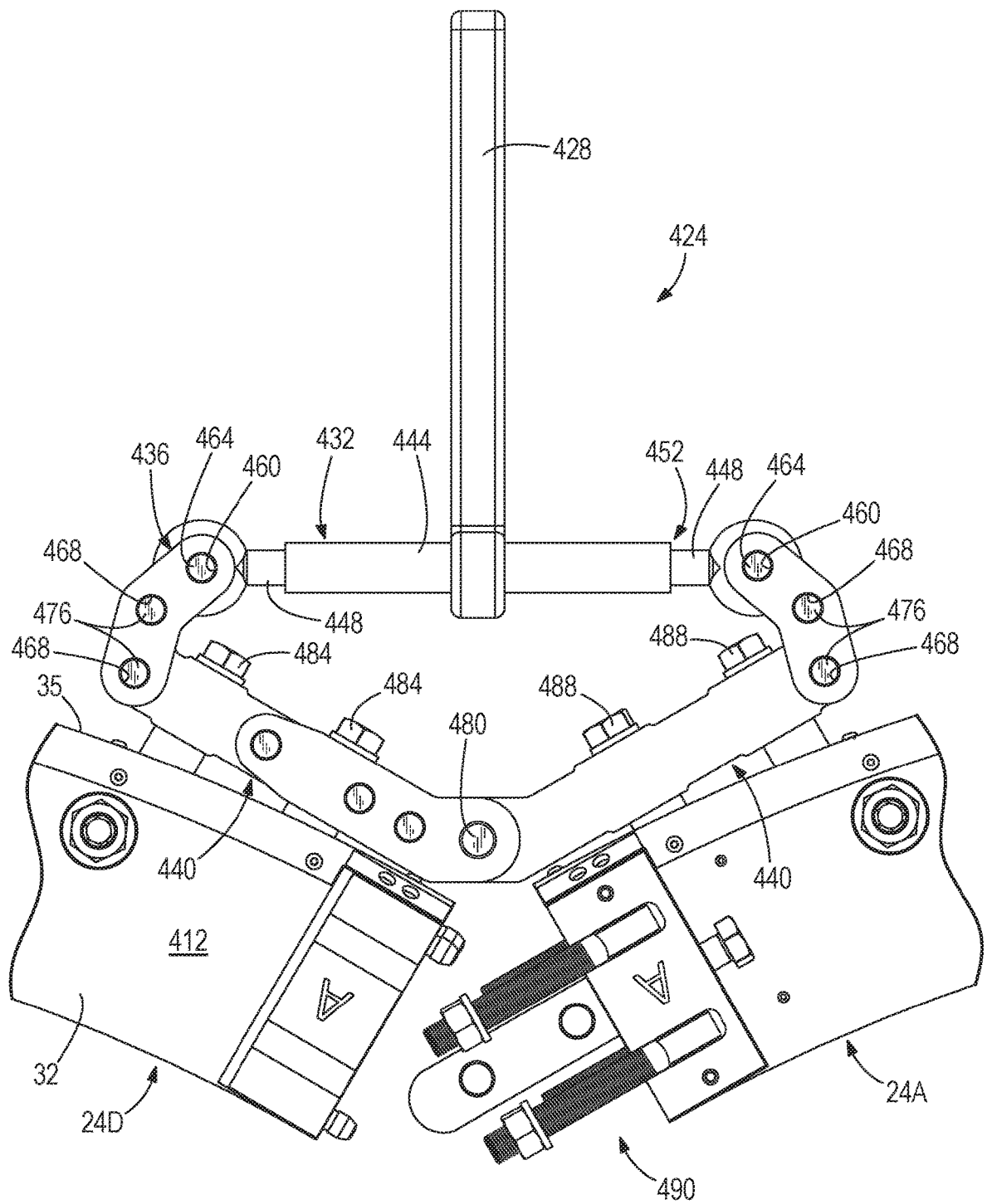
FIG. 29 is an enlarged elevational view of the hinge and a portion of the pipe machining apparatus in the separated position, in accordance with one embodiment.

Referring now to FIGS. 28 and 29, a lifting mechanism or some other appropriate drive mechanism is coupled to two of the support members 388 as shown in FIG. 28 to provide additional vertical support. After the lateral flange member 440 is uncoupled from the frame 28, a coupling mechanism 490 (such as, for example, coupling mechanisms disclosed in U.S. Provisional Patent Application No. 61/750,447, filed Jan. 9, 2013, and any non-provisional U.S. patent applications claiming priority to this provisional patent application, the entire contents of all of which are incorporated herein by reference) is utilized to initiate separation and hinging of the two halves. The fasteners 488 move within the slots 489 as the two halves move apart due to the coupling mechanism 490. Then, the two fasteners 488 are tightened to recouple the lateral flange member 440 to the frame 28. The lever 428 is then ratcheted in a first direction to pull the arms 448 inward and cause the two halves to spilt apart. The two lateral flange arms 440 rotate relative to each other about the coupling pin 480. The lever 428 continues to be ratcheted until the two halves are separated a desired amount. The hinge 424 allows proper separation of the two halves of the apparatus 20 and maintains upper ends of the two halves close together and in a proper position for recoupling the two ends together.

With particular reference to FIG. 28, the apparatus 20 is separated sufficiently to allow positioning of the apparatus 20 around a pipe. To couple the two halves of the apparatus 20 back together, a ratchet switch is switched on the lever to allow the lever 428 to ratchet in the opposite direction. The lever 428 is ratcheted in the opposite direction, thereby pushing the arms 448 outward and rotating the lateral flange members 440 back down toward their horizontal position. As the ends approach each other, the fasteners 488 are again unthreaded to uncouple the respective lateral flange member 440 from the frame 28. The coupling mechanism 490 is used to move the ends of the two halves back together, thereby causing the fasteners 488 to move within the slots 489. When the ends of the two halves are reengaged, the fasteners 488 are tightened again. This process may be repeated as needed to selectively couple and uncouple the apparatus 20 around a pipe.

Figure 30:
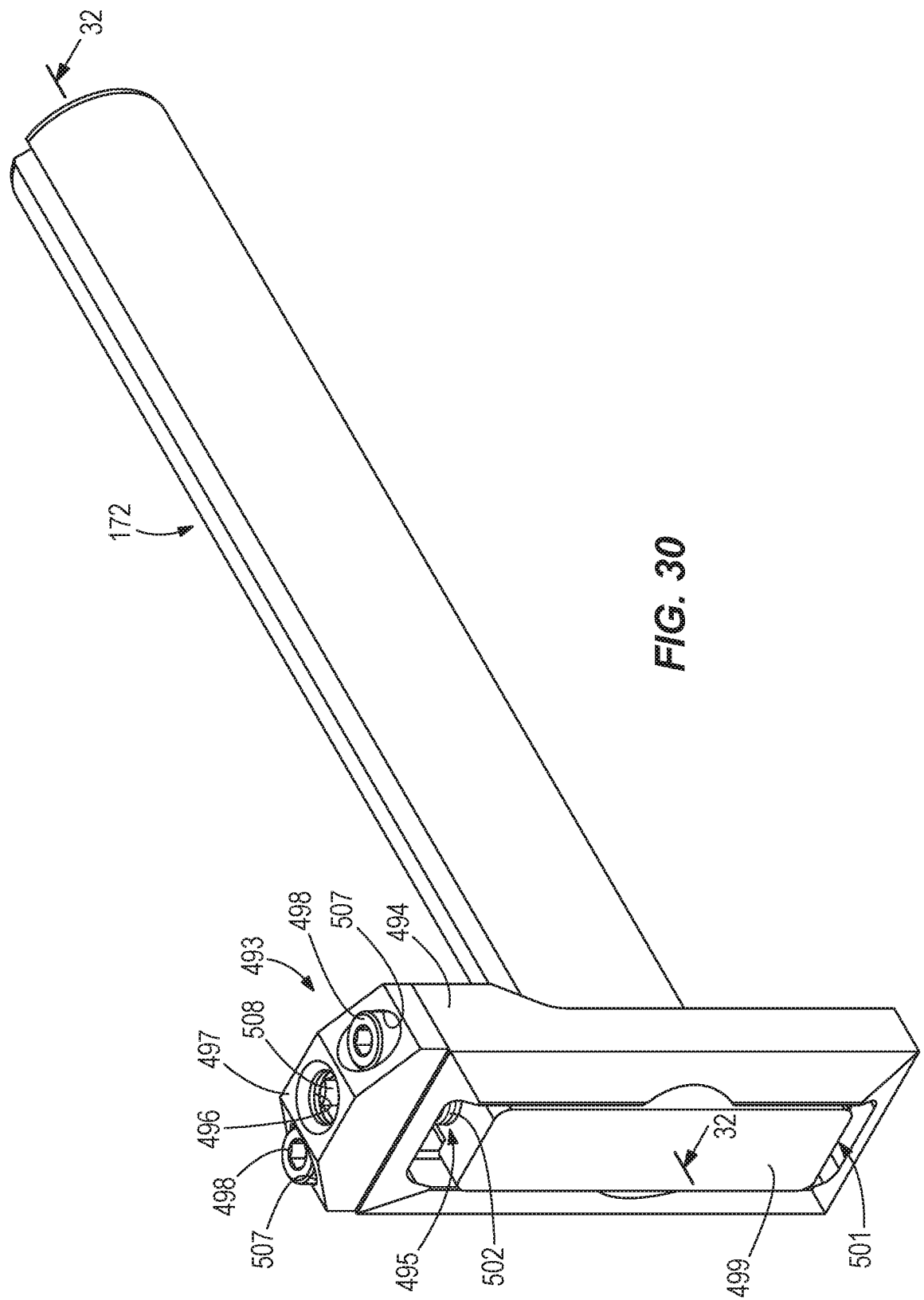
FIG. 30 is a perspective view of an exemplary pad and a portion of a coupling member, in accordance with one embodiment.
Figure 31:
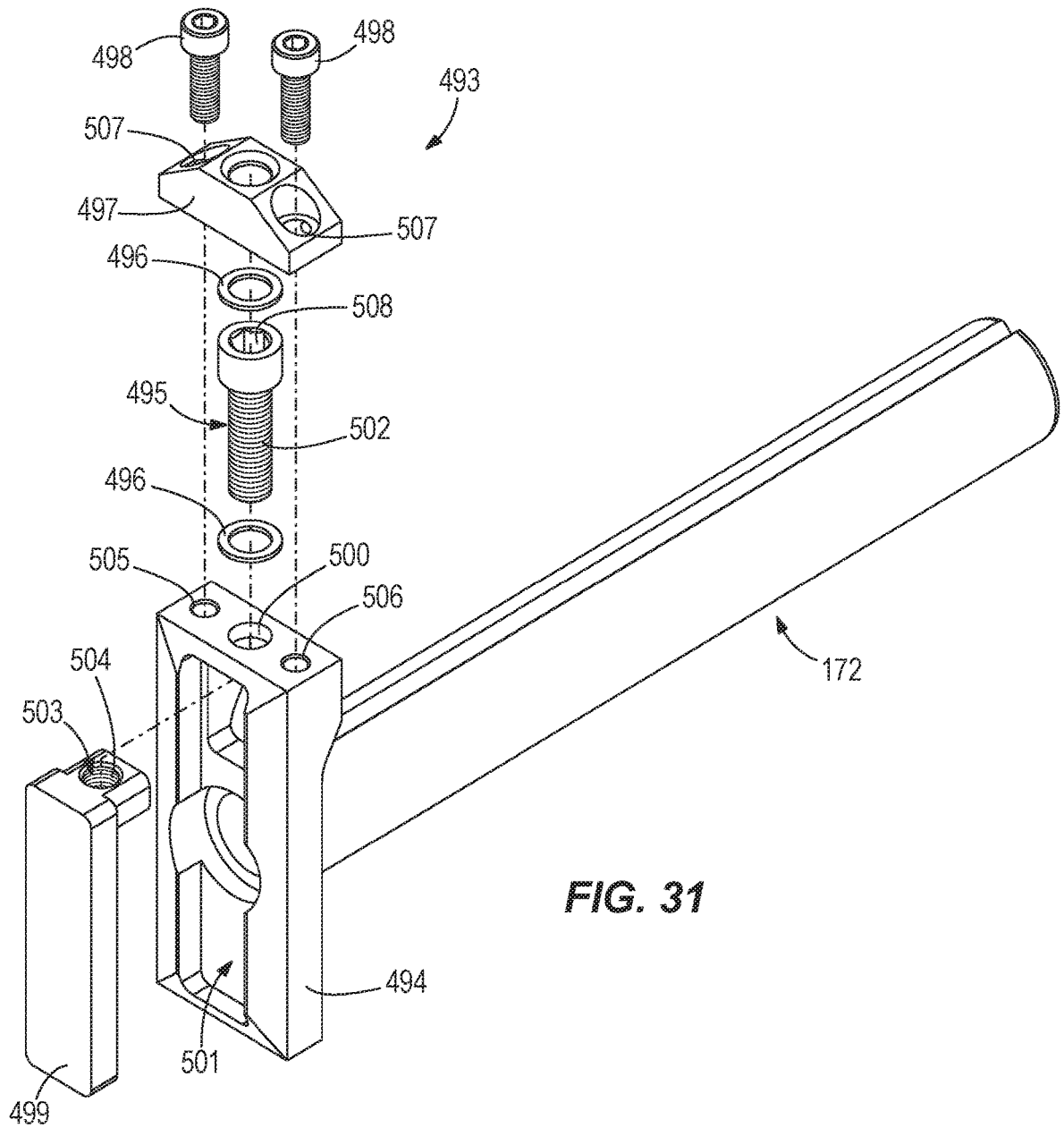
FIG. 31 is an exploded view of the pad illustrated in FIG. 30, in accordance with one embodiment.
Figure 32:
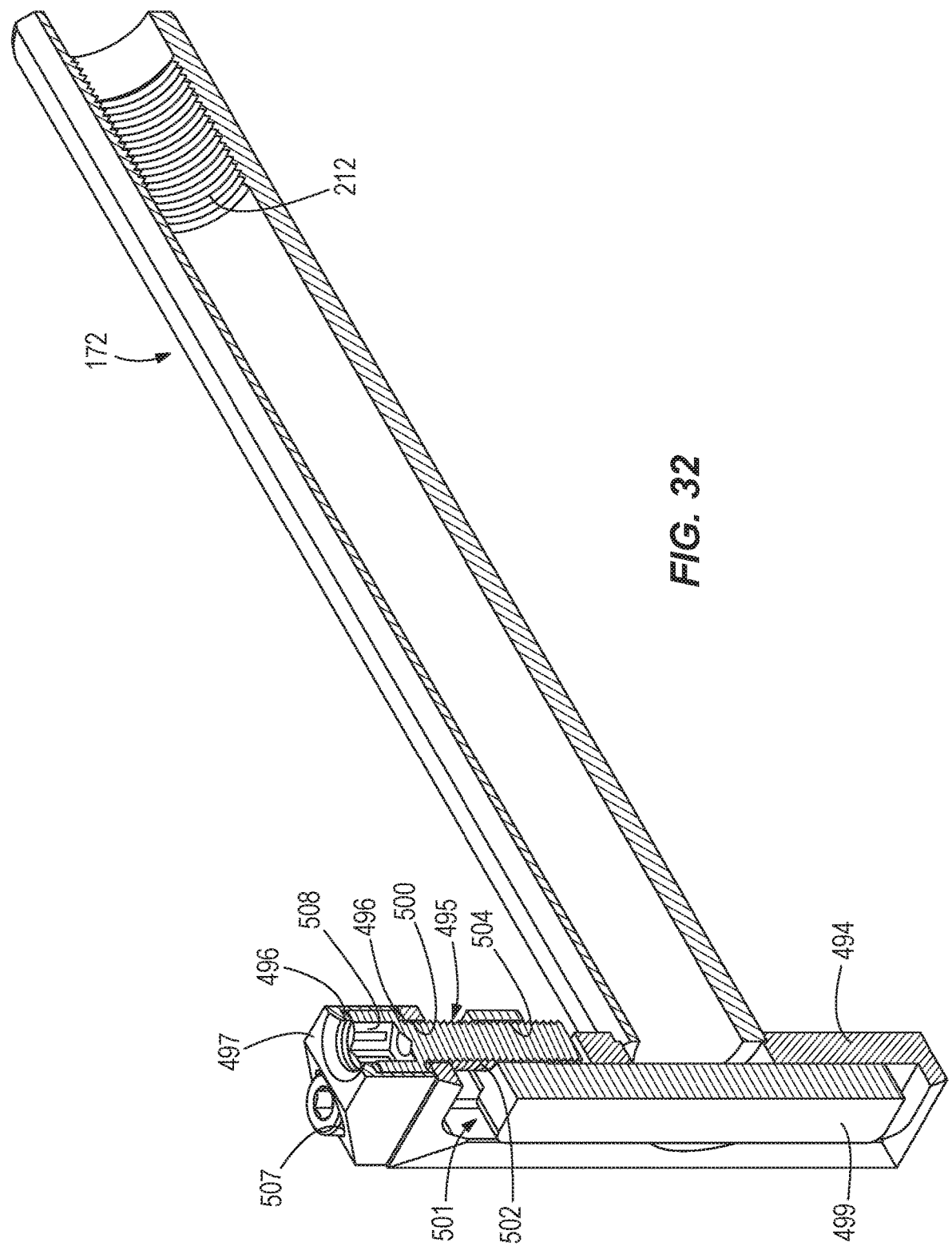
FIG. 32 is a cross-sectional view taken along line 32-32 in FIG. 30, in accordance with one embodiment.

Referring now to FIGS. 30-32, an exemplary pad 493 is illustrated coupled to a sleeve 172 of a coupling member 68. The pad 493 is adapted to engage a surface of a pipe and assist with coupling the pipe machining apparatus 20 to a pipe. The pipe machining apparatus 20 includes a plurality of coupling members 68, all of which are adapted to include the pad 493. Thus, only one of the coupling members 68 and pads 493 will be illustrated and described herein.

The pad 493 includes a housing 494, an adjustment member 495, a pair of washers 496, a cap 497, a pair of cap fasteners 498, and an engagement member 499. The housing 494 is coupled to an end of the sleeve 172, and defines a first aperture 500, in which the adjustment member 495 is positioned, and a cavity 501 adapted to receive the engagement member 499. The adjustment member 495 includes external threads 502 received in an engagement member cavity 503 including internal threads 504 complementary to the external threads 502 on the adjustment member 495. One washer 496 is positioned above a head of the adjustment member 495 and one washer 496 is positioned below the head of the adjustment member 495. The housing 494 also defines second and third apertures 505, 506 adapted to receive the cap fasteners 498 for coupling the cap 497 to the housing 494. The cap 497 includes a pair of coupling apertures 507 aligned with the second and third apertures 505, 506 in the housing 494 for receiving the cap fasteners 498. The cap 497 also defines a tool engagement 508 aligned with the head of the adjustment member 495 to allow a tool to access and rotate the adjustment member 495 when the cap 497 is coupled to the housing 494. Rotation of the adjustment member 495 causes the engagement member 499 to translate along the adjustment member 495. Rotation of the adjustment member 495 in a first direction moves the engagement member 499 in a first direction and rotation of the adjustment member 495 in a second direction moves the engagement member 499 in a second direction. Adjusting the engagement member 499 assists with positioning the machine axially relative to the pipe.

The components and resulting functionalities of the pipe machining apparatus included herein are adapted to be included in any size pipe machining apparatus to machine any size pipe and operate in the same manner, thereby providing a modularity capability to the present disclosure. That is, for example, whether the pipe machining apparatus is adapted to cut pipes of 60 inches or 120 inches, the support members or set-up legs, the coupling members for coupling to an inner or outer surface of a pipe, the locking member, roller bearing lubrication features, the support members used for lifting the pipe machining apparatus, the manners of lifting, assembling, and manipulating the sections of the apparatus, the hinge, etc., are all adapted to be included in any possible size pipe machining apparatus and operate in the same manner.

It should be understood that the use of any orientation or directional terms herein such as, for example, "top", "bottom", "front", "rear", "back", "left", "right", "side", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings. For example, the pipe machining apparatus may be utilized in any orientation and use of such terms is intended to correspond to the exemplary orientation of the pipe machining apparatus illustrated in the drawings. The use of these terms in association with the pipe machining apparatus is not intended to limit the pipe machining apparatus to a single orientation or to limit the pipe machining apparatus in any manner.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A pipe machining apparatus comprising:
a frame adapted to be coupled to and fixed relative to a pipe, the frame defining an outer circumference;
a tool carrier coupled to and rotatable relative to the frame and the pipe; and
a support member coupled to and extending outward from the outer circumference of the frame, the support member including a first flange defining a first aperture therein and adapted to be coupled to a lifting mechanism to lift the frame and the tool carrier and a second flange defining a second aperture therein and adapted to be coupled to the lifting mechanism to lift the frame and the tool carrier, wherein the first and second apertures are outward of the outer circumference of the frame, wherein in a first instance the first flange is directly coupled to the lifting mechanism to lift the frame and the tool carrier via the first aperture without the frame and the tool carrier being directly coupled to the second flange via the second aperture, and wherein in a second instance the second flange is directly coupled to the lifting mechanism to lift the frame and the tool carrier via the second aperture without the frame and the tool carrier being directly coupled to the first flange via the first aperture.

2. The pipe machining apparatus of claim 1, wherein the first flange is substantially parallel to a front surface of the tool carrier and wherein the second flange is substantially perpendicular to the first flange.

3. The pipe machining apparatus of claim 1, wherein the support member is a first support member, the pipe machining apparatus further comprising a second support member coupled to the frame and extending outward from the outer circumference of the frame, the second support member including a first flange defining a first aperture therein and a second flange defining a second aperture therein, wherein the first and second apertures are outward of the outer circumference of the frame, and wherein the first and second support members are adapted to be simultaneously coupled to a lifting mechanism to lift the pipe machining apparatus.

4. The pipe machining apparatus of claim 3, wherein the first and second support members facilitate lifting of the pipe machining apparatus in both a generally vertical position and in a generally horizontal position.

5. The pipe machining apparatus of claim 3, further comprising:
a first section including a first portion of the frame and a first portion of the tool carrier; and
a second section including a second portion of the frame and a second portion of the tool carrier, wherein the first section and the second section are adapted to be coupled together around at least a portion of a pipe.

6. The pipe machining apparatus of claim 5, wherein the first and second support members are coupled to the first section.

7. The pipe machining apparatus of claim 5, wherein the first support member is coupled to the first section and the second support member is coupled to the second section.

8. An assembly comprising:
a pipe machining apparatus comprising
a frame adapted to be coupled to and fixed relative to a pipe, the frame defining an outer circumference,
a tool carrier coupled to and rotatable relative to the frame and the pipe, and
first and second support members coupled to and extending outward from the outer circumference of the frame, each support member including a first flange defining a first aperture therein and a second flange defining a second aperture therein, wherein the first and second apertures of each support member are outward of the outer circumference of the frame; and
a lifting mechanism adapted to be coupled to the first flange of each support member to enable the pipe machining apparatus to be lifted and adapted to be separately coupled to the second flange of each support member to enable the pipe machining apparatus to be lifted, wherein in a first instance the lifting mechanism is directly coupled to the first flange of each support member via the respective first aperture to lift the pipe machining apparatus without the lifting mechanism being directly coupled to the second flange of each support member via the respective second aperture, and wherein in a second instance the lifting mechanism is directly coupled to the second flange of each support member via the respective second aperture to lift the pipe machining apparatus without the lifting mechanism being directly coupled to the first flange of each support member via the respective first aperture.

9. The assembly of claim 8, wherein each first flange is substantially parallel to a front surface of the tool carrier and wherein each second flange is substantially perpendicular to the first flange.

10. The assembly of claim 8, wherein the pipe machining apparatus further comprises
a first section including a first portion of the frame and a first portion of the tool carrier; and
a second section including a second portion of the frame and a second portion of the tool carrier, wherein the first section and the second section are adapted to be coupled together around at least a portion of a pipe.

11. The assembly of claim 10, wherein the first and second support members are coupled to the first section.

12. The assembly of claim 10, wherein the first support member is coupled to the first section and the second support member is coupled to the second section.

\* \* \* \* \*